US008666872B2

(12) United States Patent
Burns et al.

(10) Patent No.: US 8,666,872 B2
(45) Date of Patent: Mar. 4, 2014

(54) ELECTRONIC SPREAD TRADING TOOL

(75) Inventors: Michael J. Burns, Riverside, IL (US); Scott F. Singer, Lake Bluff, IL (US)

(73) Assignee: Trading Technologies International, Inc, Chicago, IL (US)

( * ) Notice: Subject to any disclaimer, the term of this patent is extended or adjusted under 35 U.S.C. 154(b) by 924 days.

(21) Appl. No.: 12/543,315

(22) Filed: Aug. 18, 2009

(65) Prior Publication Data

US 2009/0307127 A1 Dec. 10, 2009

Related U.S. Application Data

(63) Continuation of application No. 11/454,888, filed on Jun. 19, 2006, now Pat. No. 7,590,578, which is a continuation of application No. 09/880,078, filed on Jun. 14, 2001, now Pat. No. 7,243,083.

(51) Int. Cl.
*G06Q 40/00* (2006.01)

(52) U.S. Cl.
USPC .................. 705/37; 705/35; 705/36 R; 705/38

(58) Field of Classification Search
USPC .............................. 705/35, 36, 37, 38, 36 R
See application file for complete search history.

(56) References Cited

U.S. PATENT DOCUMENTS

| | | | |
|---|---|---|---|
| 4,674,044 A | 6/1987 | Kalmus et al. | |
| 4,750,135 A | 6/1988 | Boilen | |

(Continued)

FOREIGN PATENT DOCUMENTS

| | | |
|---|---|---|
| EP | 0388162 A2 | 9/1990 |
| GB | 2253081 | 8/1992 |

(Continued)

OTHER PUBLICATIONS

International Search Report for PCT/02/16865 (uploaded in U.S. Appl. No. 11/415,177).

(Continued)

*Primary Examiner* — Nga B. Nguyen
(74) *Attorney, Agent, or Firm* — McDonnell Boehnen Hulbert & Berghoff LLP

(57) ABSTRACT

A versatile and efficient electronic spread trading tool to be used when buying and selling comparable commodities either simultaneously or in conjunction with one another. The spread trading tool involves a method of displaying, on an electronic display device, the market depth of a plurality of commodities including an anchor commodity and a non-anchor commodity, where the method includes dynamically displaying a plurality of bids and asks in the market for the commodities, statically displaying prices corresponding to those plurality of bids and asks, where the bids and asks are displayed in alignment with the prices corresponding thereto, displaying an anchor visual indicator corresponding to and in alignment with a desired price level of the anchor commodity, displaying a price level indicator corresponding to and in alignment with a price level of the non-anchor commodity. Based on an unhedged position, and taking into account the parameters and spread price point values, as determined by the trader, price level indicators are calculated and displayed, which provide a visual representation of where the trader should buy and sell the applicable commodities. The price level for the price level indicator in the non-anchor commodity is determined based upon said desired price level of the anchor commodity. The price level indicator also includes a first visual indicator corresponding to and in alignment with a first price level of the non-anchor commodity and a second visual indicator corresponding to and in alignment with a second price level of the non-anchor commodity.

19 Claims, 9 Drawing Sheets

(56) References Cited

U.S. PATENT DOCUMENTS

| | | | |
|---|---|---|---|
| 4,799,156 A | 1/1989 | Shavit et al. |
| 4,823,265 A | 4/1989 | Nelson |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,243,331 A | 9/1993 | McCausland et al. |
| 5,245,535 A | 9/1993 | Weiss et al. |
| 5,270,922 A | 12/1993 | Higgins |
| 5,297,031 A | 3/1994 | Gutterman et al. |
| 5,297,032 A | 3/1994 | Trojan et al. |
| 5,339,392 A | 8/1994 | Risberg et al. |
| 5,347,452 A | 9/1994 | Bay, Jr. |
| 5,375,055 A | 12/1994 | Togher et al. |
| 5,510,979 A | 4/1996 | Moderi et al. |
| 5,619,631 A | 4/1997 | Schott |
| 5,675,746 A | 10/1997 | Marshall |
| 5,682,489 A | 10/1997 | Harrow et al. |
| 5,689,651 A | 11/1997 | Lozman |
| 5,689,652 A | 11/1997 | Lupien et al. |
| 5,692,233 A | 11/1997 | Garman |
| 5,745,383 A | 4/1998 | Barber |
| 5,767,852 A | 6/1998 | Keller et al. |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,844,572 A | 12/1998 | Schott |
| 5,845,266 A | 12/1998 | Lupien et al. |
| 5,873,071 A | 2/1999 | Ferstenberg et al. |
| 5,874,952 A | 2/1999 | Morgan |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,666 A | 8/1999 | Nevo et al. |
| 5,946,667 A | 8/1999 | Tull, Jr. et al. |
| 5,960,411 A | 9/1999 | Hartman et al. |
| 5,963,923 A | 10/1999 | Garber |
| 5,966,139 A | 10/1999 | Anupam et al. |
| 6,012,046 A | 1/2000 | Lupien et al. |
| 6,014,643 A | 1/2000 | Minton |
| 6,035,287 A | 3/2000 | Stallaert et al. |
| 6,061,660 A | 5/2000 | Eggleston et al. |
| 6,064,985 A | 5/2000 | Anderson |
| 6,098,051 A | 8/2000 | Lupien et al. |
| 6,101,484 A | 8/2000 | Halbert et al. |
| 6,115,698 A | 9/2000 | Tuck et al. |
| 6,131,087 A | 10/2000 | Luke et al. |
| 6,134,535 A | 10/2000 | Belzberg |
| 6,161,099 A | 12/2000 | Harrington et al. |
| 6,167,386 A | 12/2000 | Brown |
| 6,188,403 B1 | 2/2001 | Sacerdoti et al. |
| 6,195,647 B1 | 2/2001 | Martyn et al. |
| 6,211,873 B1 | 4/2001 | Moyer |
| 6,233,566 B1 | 5/2001 | Levine et al. |
| 6,272,474 B1 | 8/2001 | Garcia |
| 6,278,982 B1 | 8/2001 | Korhammer et al. |
| 6,282,521 B1 | 8/2001 | Howorka |
| 6,317,728 B1 | 11/2001 | Kane |
| 6,343,278 B1 | 1/2002 | Jain et al. |
| 6,408,282 B1 | 6/2002 | Buist |
| 6,418,419 B1 | 7/2002 | Nieboer et al. |
| 6,421,653 B1 | 7/2002 | May |
| 6,421,694 B1 | 7/2002 | Nawaz et al. |
| 6,493,682 B1 | 12/2002 | Horrigan et al. |
| 6,519,574 B1 | 2/2003 | Wilton |
| 6,553,346 B1 | 4/2003 | Walker et al. |
| 6,630,942 B2 | 10/2003 | Gerra et al. |
| 6,766,304 B2 | 7/2004 | Kemp, II et al. |
| 6,772,132 B1 | 8/2004 | Kemp, II et al. |
| 6,938,011 B1 | 8/2005 | Kemp, II et al. |
| 6,993,504 B1 | 1/2006 | Friesen et al. |
| 7,030,505 B2 | 4/2006 | Kimura |
| 7,212,999 B2 | 5/2007 | Friesen et |
| 7,243,083 B2 | 7/2007 | Burns et al. |
| 7,308,428 B1 | 12/2007 | Federspiel et al. |
| 7,356,498 B2 * | 4/2008 | Kaminsky et al. ............ 705/37 |
| 7,412,416 B2 | 8/2008 | Friesen et al. |
| 7,428,506 B2 * | 9/2008 | Waelbroeck et al. .......... 705/37 |
| 7,509,283 B2 | 3/2009 | Friesen et al. |
| 7,533,056 B2 | 5/2009 | Friesen et al. |
| 7,562,047 B2 | 7/2009 | Friesen et al. |
| 7,584,144 B2 | 9/2009 | Friesen et al. |
| 7,590,578 B2 | 9/2009 | Burns et al. |
| 7,636,683 B1 | 12/2009 | Mills et al. |
| 7,676,411 B2 | 3/2010 | Kemp, II et al. |
| 7,680,723 B2 | 3/2010 | Friesen et al. |
| 7,707,086 B2 | 4/2010 | Burns et al. |
| 7,720,742 B1 | 5/2010 | Mauro et al. |
| 7,725,382 B2 | 5/2010 | Kemp, II et al. |
| 7,752,122 B2 | 7/2010 | Friesen et al. |
| 7,797,220 B2 | 9/2010 | McIntyre |
| 7,908,570 B2 | 3/2011 | Schluetter et al. |
| 8,145,557 B2 | 3/2012 | Gilbert et al. |
| 8,175,955 B2 | 5/2012 | Friesen et al. |
| 8,185,467 B2 | 5/2012 | Friesen et al. |
| 8,374,952 B2 | 2/2013 | Friesen et al. |
| 2001/0034696 A1 | 10/2001 | McIntyre |
| 2001/0039527 A1 | 11/2001 | Ordish et al. |
| 2002/0023038 A1 | 2/2002 | Fritsch et al. |
| 2002/0038279 A1 | 3/2002 | Samuelson et al. |
| 2002/0055899 A1 | 5/2002 | Williams |
| 2002/0099636 A1 | 7/2002 | Narumo |
| 2002/0130868 A1 | 9/2002 | Smith |
| 2002/0138390 A1 | 9/2002 | May |
| 2002/0161690 A1 | 10/2002 | McCarthy et al. |
| 2002/0178096 A1 | 11/2002 | Marshall |
| 2002/0198816 A1 | 12/2002 | Gilbert et al. |
| 2003/0004852 A1 | 1/2003 | Burns |
| 2003/0009411 A1 | 1/2003 | Ram et al. |
| 2003/0097325 A1 | 5/2003 | Friesen et al. |
| 2003/0126068 A1 | 7/2003 | Hauk et al. |
| 2004/0099933 A1 | 5/2004 | Kimura |
| 2005/0125328 A1 | 6/2005 | Schluetter |
| 2005/0256799 A1 | 11/2005 | Warsaw et al. |
| 2006/0010066 A1 | 1/2006 | Rosenthal et al. |
| 2006/0020538 A1 | 1/2006 | Ram et al. |
| 2006/0059083 A1 | 3/2006 | Friesen et al. |
| 2006/0200405 A1 | 9/2006 | Burns et al. |
| 2006/0235787 A1 | 10/2006 | Burns et al. |
| 2006/0259405 A1 | 11/2006 | Friesen et al. |
| 2006/0259410 A1 | 11/2006 | Friesen et al. |
| 2006/0259413 A1 | 11/2006 | Friesen et al. |
| 2006/0265315 A1 | 11/2006 | Friesen et al. |
| 2006/0265318 A1 | 11/2006 | Friesen et al. |
| 2006/0265319 A1 | 11/2006 | Friesen et al. |
| 2009/0089196 A1 | 4/2009 | Friesen et al. |
| 2009/0307127 A1 | 12/2009 | Burns et al. |
| 2010/0005037 A1 | 1/2010 | Friesen et al. |
| 2010/0070402 A1 | 3/2010 | Friesen et al. |
| 2010/0235273 A1 | 9/2010 | Friesen et al. |
| 2012/0084190 A1 | 4/2012 | Messina et al. |
| 2013/0124387 A1 | 5/2013 | Friesen et al. |

FOREIGN PATENT DOCUMENTS

| | | |
|---|---|---|
| JP | 4507159 A | 12/1992 |
| JP | 6028384 A | 2/1994 |
| JP | 6504152 A | 5/1994 |
| JP | 10247210 A | 9/1998 |
| JP | 2000501864 A | 2/2000 |
| JP | 2004287819 A | 10/2004 |
| WO | 91/14231 A1 | 9/1991 |
| WO | 92/12488 A1 | 7/1992 |
| WO | 95/26005 A1 | 9/1995 |
| WO | 97/22072 A1 | 6/1997 |
| WO | 00/52619 A | 9/2000 |
| WO | WO 00/65510 | 11/2000 |
| WO | 01/02930 A2 | 1/2001 |
| WO | 01/04813 A1 | 1/2001 |
| WO | 01/08065 A1 | 2/2001 |
| WO | 01/15000 A1 | 3/2001 |

(56) References Cited

FOREIGN PATENT DOCUMENTS

| WO | WO 01/16830 | 3/2001 |
|---|---|---|
| WO | WO 01/16852 | 3/2001 |
| WO | WO 01/22315 | 3/2001 |
| WO | 01/41280 A1 | 6/2001 |
| WO | 01/75733 A1 | 10/2001 |
| WO | WO 01/88808 | 11/2001 |

OTHER PUBLICATIONS

"APT: A trading system for the cuture," The London International Financial Futures Exchange (LIFFE), 1990, 11 pages (uploaded in U.S. Appl. No. 09/880,078).

Trading Screen, INTEX of Bermuda, 1984, one page (uploaded in U.S. Appl. No. 09/880,078).

B.W. Weber, "Information Technology in the Major International Financial Markets," Stern School of Business, New York University, Apr. 7, 1993, pp. 1-43 (uploaded in U.S. Appl. No. 09/880,078).

Trading Screen, TIFFE Exchange, circa 1989-1990, one page (uploaded in U.S. Appl. No. 09/880,078).

Trading Screen, MEFF Exchange, 1990, one page (uploaded in U.S. Appl. No. 09/880,078).

C. Cavaletti, "Order Routing,", Futures Magazine, Feb. 1997, pp. 68-70 (uploaded in U.S. Appl. No. 09/880,078).

"AURORA: The most technologically advanced trading system available today," Chicago Board of Trade, 1989, 11 pages (uploaded in U.S. Appl. No. 09/880,078).

"One Click Trading Options," Trading Technologies, Inc., 1998, one page (uploaded in U.S. Appl. No. 09/880,078).

Trading Screen, SWX Exchange, 1990, two pages (uploaded in U.S. Appl. No. 09/880,078).

"Expanding futures and options trading around the world, around the clock," GLOBEX, 1989, 48 pages (uploaded in U.S. Appl. No. 09/880,078).

S. Hansell, "The computer that ate Chicago," Institutional Investor, Feb. 1989, 5 pages (uploaded in U.S. Appl. No. 09/880,078).

"Sydney Futures Exchange Announces Plans to Join GLOBEX," GLOBEX Report: An updated on the CME global electronic exchange, vol. II, No. 2, Feb. 10, 1989, 4 pages (uploaded in U.S. Appl. No. 09/880,078).

New York Mercantile Exchange (NYMEX) Access Documents, Feb. 28, 1992, 413 pages (uploaded in U.S. Appl. No. 09/880,078).

The Computer Assisted Trading System (CATS) Traders' Manual, Toronto Stock Exchange, Sep. 30, 1977, 142 pages (uploaded in U.S. Appl. No. 09/880,078).

Market Watch trading screen, date not available, 1 page (uploaded in U.S. Appl. No. 09/880,078).

Grummer et al., "Preliminary Feasibility Study," Bermudex Ltd., Nov. 1980, 100 pages (uploaded in U.S. Appl. No. 09/880,078).

Peake et al., Appendix C of Preliminary Feasibility Study, "The ABCs of Trading on a national market system," Bermudex Ltd., Sep. 1997, 16 pages (uploaded in U.S. Appl. No. 09/880,078).

J.W. Peake, Appendix E of Preliminary Feasibility Study, "The last fifteen meters," Bermudex Ltd., Jun. 15, 1997, 18 pages (uploaded in U.S. Appl. No. 09/880,078).

Declaration of Brendan Bradley in Case No. 04 C 5312, Nov. 18, 2004, 27 pages (uploaded in U.S. Appl. No. 09/880,078).

Memorandum Opinion and Order of Judge James B. Moran in Case No. 04 C 5312, Feb. 9, 2005, 22 pages (uploaded in U.S. Appl. No. 09/880,078).

Lehmann, B. and Modest, M., "Trading and Liquidity on the Tokyo Stock Exchange: A Bird's Eye View," *The Journal of Finance*, The American Finance Association, Jul. 1994, vol. 49, No. 3, pp. 951-984.

Wang, J., "Asymmetric Information and the Bid-Ask Spread: An Empirical Comparison between Automated Order Execution and Open Outcry Auction," *Journal of International Financial Markets, Institutions and Money*, Apr. 1999, vol. 9, Iss. 2, pp. 115-128.

EPO Comments to Opposition to European Patent EP 1319211 dated Dec. 1, 2010 (67 pages).

U.S. Appl. No. 60/151,468, filed Aug. 30, 1999, Friesen, et al.

U.S. Appl. No. 13/735,261, filed Jan. 7, 2013, Friesen, et al.

LIFFE CONNECT for Futures User Guide v4.5, Jun. 1999, G0025751-25806.

"Specialist vs. Saitori: Market-Making in New York and Tokyo", Richard Lindsay and Ulrike Schaede, DTX 1170, 7-8/00/1992, SilvermanOO0494-SilvermanOO0506.

A. Klein, WallStreet.com—Fat Cat Investing at the Click of a Mouse, Chapt. 14 "Finding Gold in Tribeca", 1998; Exhibit 16.

APT User Guide, 01/00/94, DX 152, LIFFE 000262-LIFFE 000363, DTX 152.

Aurora Chicago Board of Trade Brochure, 1990, ES0021230-ES0021241.

Bernstein, J., Chapter 5: "Life on the Trading Floor," *How the Futures Markets Work*, New York Institute of Finance, 1989, pp. 62-67.

Cahier de charges.doc, Feb. 9, 1999, G0111752-G0111758.

Digital trading facility weekly operations meeting outline, DX 444, DTX 444, CM 006661, May 10, 1999.

Directory of Software Solutions for LIFFE Connect, Issue 3, Jun. 10, 1999, DX 157, DTX 157.

Dow Jones & Reuters Factiva, "Date Broadcasting Partners with Alltech Investment to Provide Customers with Online Trading", Feb. 25, 1999, E8.

Dow Jones & Reuters Factiva, "Firms Rush to Make LIFFE Connect Decision", Dec. 4, 1998, E6.

Downes, J. and Goodman, J.E., Eds., *Dictionary of Finance and Investment Terms*, $5^{th}$ Ed., Barron's Educational Series, Inc., 1998, p. 329.

Ecco Consulting Study Report MEFF Software Systems, Mar. 17, 1999, ES0060578-ES0060591.

Email from Wattiez to M. Cartier attaching Matif VF: V4.50 manual, Mar. 30, 1998, DX 592, MC000046-MC000116, DTX 592.

Final Detailed Design Document NYMEX Access, May 5, 1992, eSOO03127-eSOO03541.

Functional Enhancements for LIFEE CONNECT for FUTURES Project, Mar. 3, 1999, G0119742-G0119745.

Functional Enhancements for LIFEE CONNECT for FUTURES Project, Apr. 12, 1999, G0119718-G0119724.

Functional Enhancements for LIFEE CONNECT for FUTURES Project, Apr. 12, 1999, G0119725-G0119732.

GL Enhancements Software Version 4.11 f, Oct. 29, 1998, G0060853-G0060854.

GL Enhancements Update, Jan. 27, 1999, G01 01682-G01 01688.

GL Trade Checklist—Installation Requirements for FUTURES, Jan. 1999, G0119795-G0119798.

GL Trade, CAC and Stoxx Futures on MATIF NSC VF, User Information Notes, pp. 1-14, published by GL Trade, London, England, Mar. 15, 1999.

GL Trade, LIFFE Connect for Futures, User Guide v4.50, published by GL Trade, London, England, Feb. 1999, pp. 1-39.

GL Trade, LIFFE Connect for Futures, User Guide v4.50, published by GL Trade, London, England, Mar. 1999, pp. 1-39.

GL Trade, LIFFE Connect for Futures, User Guide v4.51, published by GL Trade, London, England, Jun. 1999, pp. 1-57.

GL Trade, LIFFE Connect for Futures, User Guide, v4.50 Beta, published by GL Trade, London, England, Jan. 1999, pp. 1-24.

GL Version 4.70 (English Version), Jan. 5, 2000, G0020593-20621.

GL Version 4.70 (French Version), Jan. 5, 2000, G0026505-26533.

GL WIN and Related Software Manual, Sep. 11, 2000, 1) G0025251-25615.

GL WIN et Logiciels complementaires (French), 10/00/99, G009121-G009486.

GL WIN et Logiciels complementaires (French), 7/00/99, G009875-G010238.

GL WIN Summary (French), 6/00/98, G0091 0004-G0091 046.

GL WIN Version 4.50, Mar. 3, 1999, DX 538, G 107459-G 107480, DTX 538.

Installation, Market Entry Test, and Technical Dress Rehearsal Summary, Feb. 23, 1999.

Interactive Brokers, "Trade Futures Online with Interactive Brokers", May 9, 2005, eS0032571-eS0032572.

International Search Report of International Application No. PCT/US2000/09369, dated Aug. 2, 2001 (mailed Aug. 13, 2001).

(56) References Cited

OTHER PUBLICATIONS

Java Island Book Viewer [online], 1999, 40 pages. [Retrieved on Jun. 11, 2009 from http://www.isld.com].
Keyboard example, Feb. 3, 2006, G007308-G007310.
Kharouf, J. and Cavaletti, C. "A Trading Room with a View," *Futures*, vol. 27, Nov. 1998, pp. 66-71.
LIFFE CONNECT for Equity Options User Guide v4.30, Nov. 1998, G0119052-G0119086.
LIFFE CONNECT for Futures Schedule for Project Deliverables, Feb. 4, 1999, G0119681-G0119682.
LIFFE CONNECT for Futures: Project Summary: Apr. 19, 1999, G0119705-G0119717.
LIFFE CONNECT Futures Release Note 050399.doc, Mar. 3, 1998, G0111402-G0111407.
LIFFE's New Electronic Trading Platform for Futures, LIFFE 202-261, Opposition EP 1319211 B1 Exhibit 8D, Sep. 24, 1998.
Market Trader—Nikkel 225 & Nikkel 300 Index options and Index futures trading users guide, Mar. 20, 1998, DX 618, G1 00444-G100462, DTX 618.
MEFF Renta Fija Manual, DTX 1165, 10/00/1997, SilvermanOO0410-SilvermanOO0473.
Memo re: Dual ACCESS Version 4.5 release, Mar. 21, 1999, G0022956-G0022959.
Memorandum Opinion and Order issued by Judge Virginia M. Kendall in *Trading Technologies International, Inc.* v. *BCG Partners, Inc.*, Case 1:10-cv-00715, dated Feb. 9, 2012.
Midas Kapiti Delivery Note and Release Note—Market Trader V5.2b, Mar. 31, 1999, DX 619, G 096511-G 096527, DTX 619.
Midas Kapiti Delivery Note and Release Note—Market Trader V5.2e, DX 623, G 105641-G105667, DTX 623,May 24, 1999.
Midas Kapiti Release Notes—Market Trader V5.2, DX 621, G 096712-G 096727, DTX 621, May 26, 1999.
Midas Kapiti Release Notes—Market Trader V5.2e, Apr. 12, 1999, DX 620, G096694-G 096711, DTX 620.
Midas Kapiti Release Notes—Market Trader V5.2e, DX 622, G 096728-G 096754, DTX 622, Jun. 1, 1999.
MINEX Service Outline User Test/Orientation, Sep. 1992, eS0064647-eS0064670.
Nicholas Economides, "Electronic Call Market Trading", Journal of Portfolio Management, 2/00/1995, eS0069585-eS0069610.
OM CLICK Trade User's Guide for Windows NT, 10/00/1998, eS00064671-e500064773.
ORC Instructions for Use Version 2.2.8., 1999, eS0064775-e50032572.
Osaka Stock Exchange Manual (Japanese Document), Apr. 1996 REFCOOO09773- REFCOOO09826.
Patsystems News Rel. Nov. 6, 2000.
Presentation re WIT DSM user interface Trade4.ppt, Oct. 12, 1998, DX 430, CM 008265-CM 008330, DTX 430.
PTS trading application Version 1.1 Beta H.1, Mar. 31, 1998, DX 118, PATS 00560-PATS 00560, DTX 118.
Release Notes—Market Trader V5.2a, Mar. 18, 1999, DX 617, G 118137-G 118152,DTX617.
ScreenShots: Patsystem "Canned" Demo, 2/00/97, DX 120, PATS 00545-PATS 00559, DTX 120.
Securities Industries News, "TT Upgrades Software Platform", Aug. 28, 2000 (D6).
Swiss Exchange SWX—TS User Manual, Dec. 31, 1998, DTX 2215, eS0032293-eS0032547.
Terminal Use Manual—Windows NT Version, Tokyo International Financial Futures Exchange (TIFFE), 0/0/1994, Silverman002552-Silverman002616, DTX 1226.
Thomson Financial leaflet, 09/00/2003, G0022445-22450.
TIFFE Internet Article, "New On-Screen Trading Terminals", E2, retrieved from the internet on Oct. 1, 2006.
TIFFE Manual (Japanese Document), Jan. 1996, REFC00010861-REFC00011210.
Tokyo Stock Exchange, Document 1, "Downloading the Terminal Program and Sending the Replacement for the Guidelines for Operating the Trading Terminals", Jan. 2000.
Tokyo Stock Exchange, Publication 1, "Next-Generation Futures Options Trading System" (participants seminar materials), Sep. 1997.
Tokyo Stock Exchange, Publication 2, "Futures/Options Trading System Guidelines for Operating the Trading Terminals", Aug. 1998.
Tokyo Stock Exchange, Publication 3, "Tokyo Stock Exchange 50th Anniversary Book of Materials", Jul. 31, 2000.
REFCO English Translation of Tokyo Stock Exchange, Publication 1, "Next-Generation Futures Options Trading System" (participants seminar materials), Sep. 1997.
REFCO English Translation of Tokyo Stock Exchange, Publication 2, "Futures/Options Trading System Guidelines for Operating the Trading Terminals" (participants seminar materials), Aug. 1998.
REFCO English Translation Tokyo Stock Exchange, Publication 3, "Tokyo Stock Exchange $50^{th}$ Anniversary Book of Materials", Jul. 31, 2000.
TradePad.vsd Document, Feb. 9, 1999, Go11169-G0111672.
Trading Pad Document (E3), Jul. 27, 2005.
Trading Pad User Manual, Aug. 10, 1999, DX 539, G 112123-G 112131, DTX 539.
Trading pad.doc Document, Jan. 26, 1999, G0111671-G0111672.
Trading Technologies Trader System User Documentation, Apr. 1, 1998, Release 3.10, DX 3, TT 015867-TT 015955, DTX 3.
TradingPad.doc, Apr. 30, 1999, G0112117-G0112122.
TSE Manual (Japanese Document), Nov. 15, 2005,DX179,TSE647-995,w/certified translation eS62258-62366 [TSE609-647,694-711,714-721,735-736,749-756,759-760,779-782,784-810,982-995].
TT X-Trader Brochure, Dec. 1, 2006 (E7).
Updated negotiations design to E. Lang from C. Mauro for review and approval prior to patent application, DX 434, CM 008410-CM 008414, DTX 434,Jan. 18, 1999.
User Guide V4.60 LIFFE Connect for Futures by GL Trade, 06/00/99, DX 605, G 123548-G 123603, DTX 605.
User Interface Design for display options design, DX 426, CM 000249-CM 000287, DTX 426, Jul. 8, 1998.
User interface design specification for WIT capital digital stock market, DX 433, DTX 433 CM 008441-CM 008478, Jan. 18, 1999.
USPTO Presentation, NASDAQ, Nov. 8, 2001, 15 pages.
WIT Capital after hours trading system, Mauro, Mar. 19, 1999, DX 440, CM 009028-CM 009059, DTX 440.
WIT Capital limit order book to L. Forrest from C. Mauro, DX 425, CM 007382-CM 007411, DTX 425, Apr. 20, 1998.
WIT Capital pdf operator manual for Digital trading facility, 00/00/1999, DX 442, CM 00651 O-CM 006513, DTX 442.
WIT Digital Stock Market, User Interface Rev. 9, Exhibit 15, copied on Oct. 16, 2006.
WIT DSM Presentation re Information display and decision variables, Dec. 20, 1998, DX 431, CM 004334-CM 004347, DTX 431.
WIT DSM user interface instructions, Aug. 6, 1998, DX 427, CM 006591-CM 006632, DTX 427.
Wright, W., "Research Report—Information Animation Applications in the Capital Markets," Visible Decisions, Inc., *IEEE*, 1995, pp. 19-25 & 136-137.
Yahoo! Finance [online], Yahoo!, 1995, p. 1.
Lehmann, B. N., et al., "Trading and Liquidity on the Tokyo Stock Exchange: A Bird's Eye View," The Journal of Finance, pp. 951-984, vol. 49, Abstract Only, 2011.
Wang, Jianxin, "Asymmetric information and the bid-ask spread: an empirical comparison between automated order execution and open outcry auction," Journal of International Financial Markets Institutions and Money 9 (1999) 115-128.
GL Product Leaflet Re: Mosaic, G0022529-22530, alleged available as of Jan. 1, 2001.
GL Trading Pad Manual, G0020819-G0020826, alleged available as of Aug. 12, 1999.
GL WIN and Related Software Manual, 2) G0025942-26267, alleged available as of Feb. 4, 1999.
GL WIN and Related Software Manual, 3) G01 0239-10610, alleged available as of Sep. 11, 2000.
GL WIN Version 4.51, G0118856-G0118865, alleged available as of Jun. 2, 1999.
Internal Product News doc on QuickTrade, G0020468-20471, alleged available as of Jan. 1, 2001.

(56) References Cited

OTHER PUBLICATIONS

LIFFE CONNECT for Futures leaflet, G0023885-23888, alleged available as of Jan. 20, 1999.
LIFFE guide/pamphlet, DX 148, DTX 148, alleged available as of Jan. 1, 1994.
Overview re Digital trading facility, DX 443, CM 006315-CM 006344, DTX 443, alleged available as of Jan. 1, 1999.
Overview re SPATS; the Electronic Broker, DX 446, DTX 446, alleged available as of Jun. 26, 1986.
PTS Client Version 2.1 F, DX 119, PATS 00067-PATS 00082, DTX 119, alleged available as of Mar. 1, 1998.
QuickTrade Document and Brochure, G021027-021031, alleged available as of Aug. 23, 2001.
Screenshot of GL TradePad, G0119660, alleged available as of Jan. 26, 1999.
System for Buying and Selling Futures and Options Transaction Terminal Operational Guidelines, TSE Business Systems Dept., TSE00647-81 0, eS0622977-eS062366, D1 (2), alleged available as of Aug. 1, 1998.
TradePad Instructions (French), G0025748-G0025749, alleged available as of Jan. 11, 1999.
TSE Japanese Document, pp. 4-15, alleged available as of Aug. 1, 1997.
TSE Japanese Document, pp. 6-15, alleged available as of Aug. 1, 1998.
WIT Capital Digital trading facility presentation to PaineWebber, Inc., DX 439, DTX 439, alleged available as of Nov. 11, 1998.
Declaration of Walter Buist, Exhibit 17, Apr. 26, 2007; with Faxed Signature Page.
Extended European Search Report in European Patent Application No. 10182744.2 dated Mar. 18, 2011, mailed Mar. 25, 2011.
Extended European Search Report in European Patent Application No. 10182761.6 dated Apr. 8, 2011, mailed Apr. 18, 2011.
Kharouf, Jim, "Exchanges Put on New Game Faces", Futures, Futures Magazine Group (US), Oct. 1998, vol. 2, No. 10, pp. 86-88, 92.

\* cited by examiner

Fig. 4

START — 402: Trader has market displayed on his computer screen → 404: Trader sets 'Anchor' for one of the legs → 406: Trader sets a ratio for each of the legs (e.g. 5:3) → 428: Is autoload activated?

- Yes → 430: If yes, then non-anchored leg's quantity will be automatically updated. If no, then user's input values will appear. → To Fig. 4 cont.
- No → To Fig. 4 cont.

432: Trader enters figures in the 'Spread Price Points' boxes → 434: Multiplier figures entered by the present invention → 438 END: Indicator location is calculated and marked for the Buy and Sell columns of the second leg

Fig. 6

ELECTRONIC SPREAD TRADING TOOL

CROSS-REFERENCE TO RELATED APPLICATIONS

The present application is a continuation of U.S. patent application Ser. No. 11/454,888, filed Jun. 19, 2006 in the name of Burns et al., entitled "Electronic Spread Trading Tool," now U.S. Pat. No. 7,590,578, which is a continuation of U.S. patent application Ser. No. 09/880,078, filed Jun. 14, 2001 in the name of Burns et al., entitled "Electronic Spread Trading Tool," now U.S. Pat. No. 7,243,083.

BACKGROUND OF THE INVENTION

A. Field of the Invention

The present invention is generally directed to the electronic trading of commodities, where a commodity includes anything that can be traded with quantities and/or prices. Specifically, the invention provides a trader with a versatile and efficient electronic spread trading tool to be used when buying and selling commodities of the same or similar class either simultaneously or in conjunction with one another.

B. Description of the Related Art

As the world's exchanges shift from open outcry to electronic trading, more and more traders participate in the market via a computer. Electronic exchanges have expanded direct access by allowing anyone with a computer and a connection to an exchange to trade directly in the exchange. Traders are now using software that creates specialized interactive trading screens on their desktops. The range and quality of features available to traders on their screens varies according to the specific software application being run. The installation of open interfaces in the development of an exchange's electronic strategy means users can choose, depending on their trading style and internal requirements, the means by which they will access the exchange. The electronic trading screens enable traders to enter and execute orders, obtain market quotes, and create and monitor positions while implementing various trading strategies previously used on the floor of an exchange. Such strategies incorporated into an electronic marketplace improve the speed, accuracy, and ultimately the profitability of trading electronically. One such trading strategy is spread trading.

A spread is simply the simultaneous buying of one commodity and the selling of another. To be a true spread, however, there must be some reason to believe that the conditions that will cause price movement in one contract will also cause price movement in the other. Spread trading is the process of protecting a position where an investment is made by taking an offsetting position in a related product in order to reduce the risk of adverse price movements. For example, a trader might simultaneously buy and sell two options of the same class at different strike prices and/or expiration dates. Typically, spread trading is used to describe a "short" position taken to offset a "long" position in the market. A long position is one where a trader has purchased a commodity at a specific price with the intent of selling that commodity at a higher price. A short position is one where the trader has effectively sold the commodity first with the intent of buying it later at a lower price. When trading stocks, the trader would take a short position by borrowing the stocks and selling them first. Later he would buy the same stocks back (hopefully at a lower price) to replace the ones he sold earlier. If trading futures, the short position could effectively entail a promise to sell a commodity (e.g. corn, soy beans, futures contracts themselves, etc.) at a certain (high) price and buying the same or comparable commodity at a given (lower) price.

Often traders will utilize spread trading to trade the yield curve for bonds or other debt securities. Typically, as the term of a security increases, the yield increases proportionately. This phenomenon can be charted on two axes (Price or Yield and Time) to create the "yield curve." The yield curve often starts with the yield rates for the shortest term securities and extends towards longer term securities. It reflects the market's views about implied inflation/deflation, liquidity, economic and financial activity and other market forces. When the actual yield curve is disproportionate, traders may take long and short positions on different maturity dates to take advantage and manage their risk. The yield curve plots current yields of fixed interest securities against their times to redemption (maturity), and enables investors to compare the yields of short, medium, and long term securities at a given time. If short-term rates are lower than long-term, it is called a positive yield curve. If short-term rates are higher, it is called a negative, or inverted yield curve. If there is little difference, it is called a flat yield curve.

SUMMARY OF THE INVENTION

The present invention can be summarized as a method of displaying, on an electronic display device, the market depth of a plurality of commodities including an anchor commodity and a non-anchor commodity, where the method includes dynamically displaying a plurality of bids and asks in the market for the commodities, statically displaying prices corresponding to those plurality of bids and asks, where the bids and asks are displayed in alignment with the prices corresponding thereto, displaying an anchor visual indicator corresponding to and in alignment with a desired price level of the anchor commodity, displaying a price level indicator corresponding to and in alignment with a price level of the non-anchor commodity. The price level for the price level indicator in the non-anchor commodity is determined based upon said desired price level of the anchor commodity.

In a further embodiment of the invention, the price level indicator also includes a first visual indicator corresponding to and in alignment with a first price level of the non-anchor commodity and a second visual indicator corresponding to and in alignment with a second price level of the non-anchor commodity.

Also, the invention includes a method of facilitating spread trading among a plurality of commodities, including an anchor commodity and a non-anchor commodity, using a graphical user interface and a user input device, where the method includes: displaying the market depth of those commodities traded in a market, through a dynamic display of a plurality of bids and asks for the commodities, including the bid and ask quantities of the commodities, aligned with static displays of prices corresponding thereto, determining a desired price level for the anchor commodity, displaying an anchor visual indicator corresponding to and in alignment with the desired price level of the anchor commodity, determining a price level for the non-anchor commodity based upon the desired price level for the anchor commodity, displaying a price level indicator corresponding to and in alignment with the determined price level of the non-anchor commodity, allowing the placement of a trade order of the anchor commodity through a single action of the user device with a pointer of the user input device positioned over an area in the dynamic displays of bids and asks in the market for the anchor commodity, allowing the placement of a trade order of the non-anchor commodity through a single action of the user device with a pointer of the user device positioned over an area in the dynamic displays of bids and asks in the market for the non-anchor commodity. Making the single action when the pointer is positioned at the location of the price level indicator allows for the placement of a spread trade.

These embodiments, and others described in greater detail herein, provide the trader with improved efficiency and versatility in placing, and thus executing, trade orders for commodities in an electronic exchange. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which:

FIG. 6 illustrates the range indicators feature of the present invention;

DETAILED DESCRIPTION OF THE INVENTION

Figure 1:
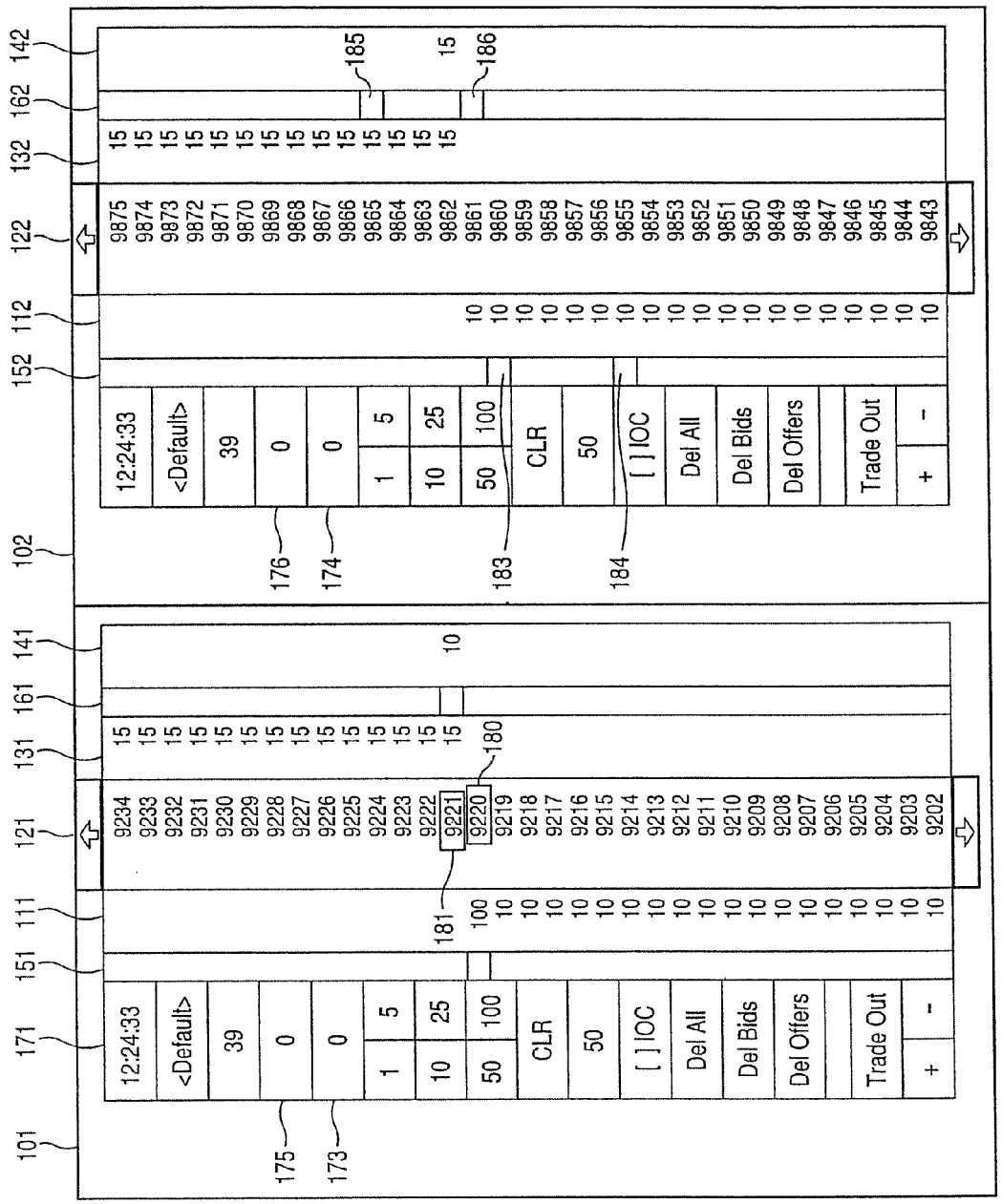
FIG. 1 illustrates two Mercury Display panes used in the preferred embodiment of the present invention.

The present invention ("Spread Tool") builds on the innovations of a prior invention submitted by the owner as U.S. patent application Ser. No. 09/590,692 ("Click Based Trading With Intuitive Grid Display of Market Depth") filed on Jun. 9, 2000, now U.S. Pat. No. 6,772,132, the contents of which are incorporated by reference herein. As set forth in the aforementioned application, the preferred embodiment of the intuitive grid display (also known as the "Mercury Display") is a static vertical column of prices for a given commodity with the bid and ask quantities dynamically displayed in vertical columns to the side of the price column and aligned with the corresponding bid and ask prices. The application also describes a method and system for placing trade orders using such displays.

As described with reference to the accompanying figures, the present invention provides methods for displaying and trading that better facilitate spread trading among a plurality of commodities in the market. The spread trading tool of the present invention works with a variety of trading displays, and is particularly suitable for use with the Mercury Display which displays market depth on a vertical or horizontal plane, which fluctuates logically up or down, left or right across the plane as the market prices fluctuates.

The Spread Tool utilizes the graphic user interface described therein (the Mercury Display), and adds new features to facilitate spread trading. The Spread Tool enables traders to define and manage trading opportunities in the pricing of products for one or more markets. This feature will place two Mercury Display style panes side by side, with each pane serving as a leg in a spread. By showing market depth and market movements for both legs of the trader's spread, it will display opportunities that the trader can act upon. The Spread Tool is based on the daily net change differential between the legs, and maintains the same functionality that is currently available in the Mercury Display window, while adding market columns that are used to indicate price points.

In one aspect, the present invention overcomes the drawbacks of the existing trading systems and simultaneously displays the buy and sell opportunities of related commodities. A spread trade forms a position comparing two parts, each of which may profit from opposite directional price moves. As orders, these parts are entered and can be executed simultaneously in the hope of (1) limiting risk, or (2) benefiting from a change in the price relationship by legging (the separate execution of component parts of an entire position) at prices better than the prevailing spread market price.

Spread trading, as described herein, enables a trader to hedge against market losses should the market move against that trader's position. Essentially, hedging is an investment that is made in order to reduce the risk of adverse price movement by taking an offsetting position in a related commodity. Spread trading in general is a style of trading that allows traders to limit the risk of the positions they take in commodities by trading comparable commodities at comparable levels. A spread is intended to limit the amount of potential loss that a trader may incur. However, by simultaneously trading (buying and selling) similar commodities, and therefore offsetting a long position with a short position or vice versa, a trader may also limit their profitability (the maximum amount to be made).

The present electronic spread trading tool uses various settings, selected by the trader, to calculate a range (spread) that the trader can use in the simultaneous purchase and/or sale of related commodities by showing him where (at what prices) an order should be submitted. The settings that are used in the calculation of a spread within the preset invention include: Ratio, Anchor, Price Points On, Multiplier, Settlement, and Spread Price Point values (2 Buy and 2 Sell). The trader must designate one commodity as the "anchor" contract, which is the contract upon which the buy and sell levels are based. The trader then needs to select one option from a 'Price Points On' display and also a Ratio between the prices of each commodity. In addition, he needs to set the Spread Price Point values for his desired spread position. The present invention will then automatically place indicators (markers) on the Mercury Display by the appropriate price rows for each commodity in order to guide the trader's entry into in the market. The pre-determined ratio and values, entered by a trader, determine where the price markers are placed. The price markers give the trader a visual display of his intended positions, and based on where he entered the market in the anchor, he is shown where he should place an order(s) for the non-anchor in order to achieve his desired spread.

Although traders may trade more than two commodities at a time to conduct spread trades, and the present invention will allow for infinite numbers of commodities to be traded in a spread trade, for consistency and ease of reading, we will limit our examples and descriptions to spread trades involving two commodities. In addition, although the preferred embodiment of the invention calls for a vertical display of the prices in the market, they also could be displayed horizontally or in other ways, just as the Mercury display may be displayed in multiple ways.

Figure 5:
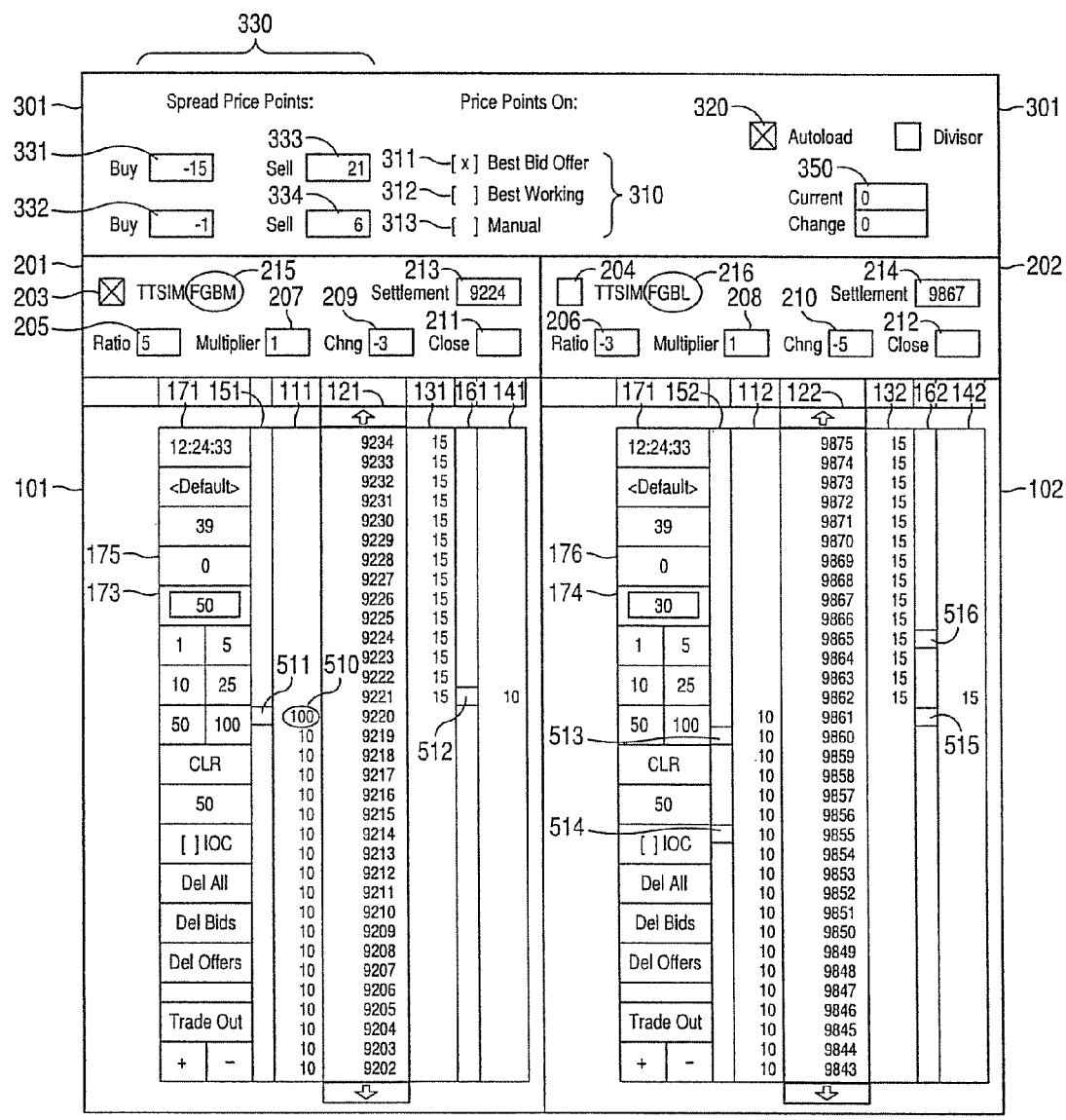
FIG. 5 illustrates a complete display of the preferred embodiment of the present invention.

In the preferred embodiment, when the spread tool is first invoked, a window composed of five panes will display on the trader's workstation. A typical display according to the present invention is shown in FIG. 5.

In the preferred embodiment, the present invention is implemented on a computer or electronic terminal. The computer is able to communicate either directly or indirectly (using intermediate devices) with the exchange to receive and transmit market, commodity, and trading order information. It is able to interact with the trader and to generate contents and characteristics of a trade order to be sent to the exchange. It is envisioned that the system of the present invention can be implemented on any existing or future terminal or device with the processing capability to perform the functions described herein. The scope of the present invention is not limited by the type of terminal or device used. Further, in the context of placing trade orders, a single click of a mouse as a means for user input and interaction with the terminal display is an example of a single action of the user. While a mouse click describes a preferred mode of interaction, the scope of the present invention is not limited to the use of a mouse as the input device or to the click of a mouse button as the user's single action. Rather, any action by a user within a short period of time, whether comprising one or more clicks of a mouse button or other input device, such as a keyboard, light pen, or a variety of other means, is considered a single action of the user for the purposes of the present invention.

The present invention includes the display of "market depth" and allows traders to view the market depth of one or more commodities and to execute trades within the market depth of the commodities. Market depth is defined as the order book with the current bid and ask prices and quantities in the market. In other words, market depth is each bid and ask that was entered into the market in addition to the inside market. For a commodity being traded, the "inside market" is the highest bid price and the lowest ask price.

The exchange sends the price, order and fill information to each trader on the exchange. The present invention processes this information and maps it through simple algorithms and mapping tables to positions in a theoretical grid program or using any other comparable mapping technique for mapping data to a screen. The physical mapping of such information to a screen grid can be done by any technique known to those skilled in the art. The present invention is not limited by the method used to map the data to the screen display.

How far into the market depth the present invention can display depends on how much of the market depth the exchange provides. Some exchanges supply an infinite market depth, while others provide no market depth or only a few orders away from the inside market. The user of the present invention can also choose how far into the market depth to display on his screen.

In the preferred embodiment of the invention, the spread tool window is composed of five panes. These are illustrated as FIGS. 1-3. Two of the panes (one for each leg) mirror the Mercury Display screen, two more panes serve as an attachment to the Mercury Display panes and contain various input fields, and the fifth pane, displayed as a common header pane, contains user input fields that pertain to the spread as a whole. The following section will provide an explanation and illustration of these input fields (settings).

To activate the present invention and begin spread trading, a trader would select comparable commodities (e.g. FGBM and FGBL) for which the working orders that are currently in the market at the selected exchange would be displayed on two parallel Mercury display panes 101 and 102 within the spread tool window. Each pane constitutes one leg of the spread and comprises a Bid column 111,112, an Ask column 131,132, a Price column 121,122, a column for the last traded quantity 141,142, and columns for designating the trader's current bid 151, current offer 161, and the price level indicators 152,162. The price level indicators, which are calculated by the present invention using data that is input by the trader, will provide the trader with a visual representation of where he should trade based on his specified ratio. In addition, on each leg there is a column 171,172 containing miscellaneous information such as the Net Position 175,176 and the Order Quantity 173,174. The Order Quantity is the quantity that will be used when the next order for that leg is entered. The non-anchor quantity can be entered manually or autoloaded and calculated as follows: (anchor leg's net position/anchor leg's ratio)×(non-anchor ratio)−(net position of non-anchored leg). The Net Position is the difference between the total number of securities owned (long) and owed (short).

The two panes (one for each leg) 201,202 attached to the Mercury Display panes (FIG. 2) provide input fields that are used in the calculation of the price level indicators. The aforementioned input fields include Anchor 203,204, Ratio 205, 206, Multiplier 207,208, Change 209,210, Close 211,212, Settlement 213,214, and product designations 215,216. A trader operating the present invention has the option of choosing either leg as the anchor contract by simply checking one of the two mutually exclusive anchor check boxes 203,204. The buy and sell levels will be based upon the anchor contract and the location of the spread point indicators will be calculated for the non-anchored contract. In the preferred embodiment, when the spread tool is first invoked, the contract that is displayed on the left side of the window will default to the anchor contract. The present invention contains two text boxes 205,206 for entering the Ratio for the spread. Of the two values, one applies to each separate leg. For example, if the user enters 5 for the first leg and 3 for the second leg, then the ratio is 5:−3. The ratio applies to the net position for each leg. For example, if a trader wants to maintain the ratio, and is currently long 5 contracts for the first leg, then that trader should be short 3 contracts for the second leg. A trader wants to identify a quantity ratio that he believes captures the volatility relationship between the two products. The tendency of a product's price to rise or fall sharply within a short period is its volatility. The trader will want to tip the ratio in favor of the least volatile product.

A trader identifies a Multiplier 207,208 in order to homogenize the products in terms of tick and currency differentials. For example, if one product is in Euros and another product is in U.S. Dollars, the Multiplier feature would be used to convert the two products into a uniform currency (e.g. both in U.S. Dollars). The Settlement text box 213,214 displays the price of the last transaction for a given product at the end of a given trading session. If a Settlement value is not provided by an exchange, then the Close value 211,212 will be used and will appear in the Close text box on each leg. The Change text box 209,210 of the present invention displays the net change for each leg of the spread, and is calculated by subtracting the Settlement price from the Last Traded (Current) price.

Figure 3:
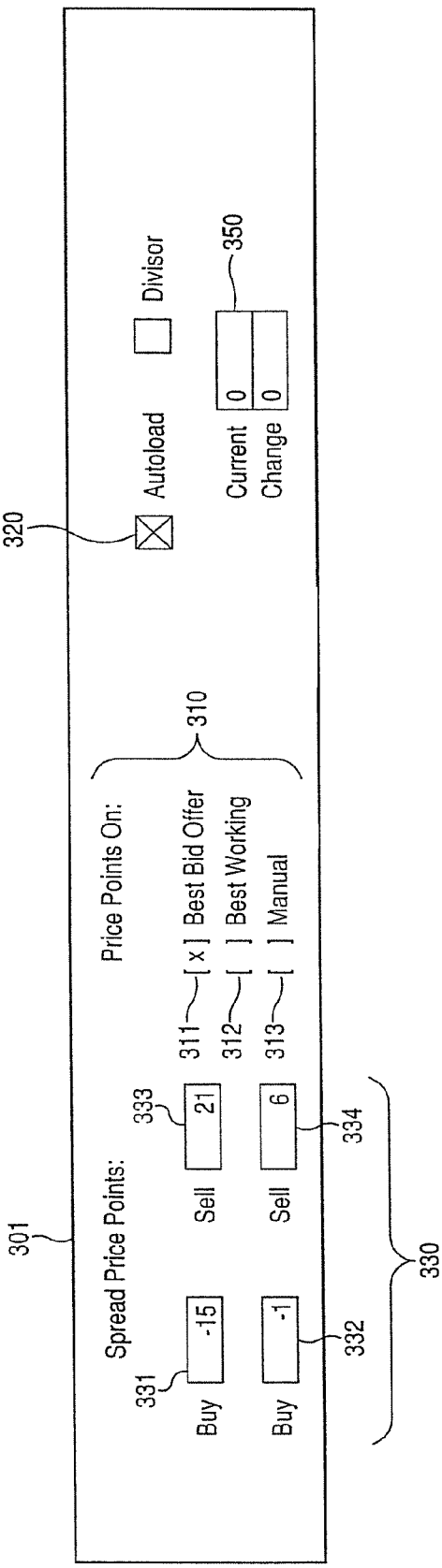
FIG. 3 illustrates a common pane used for additional display and input of parameters.

The Common Pane 301, as shown in FIG. 3, contains several user input fields that assist in determining the location of the spread's price indicators. These fields include Price Points On 310, Autoload 320, Current 350, and Spread Price Point values 330 for the Spread. The Price Points On field is applied to the anchored contract and allows a trader to choose the pricing method that will be used to determine the price points for the other leg. The Price Points On 310 options include Best Bid/Offer 311 (from the market), Best Working 312 (uses the trader's best working orders from the anchor contract to determine the buy and sell price points for the opposite leg), and Manual 313 (the user manually selects the buy and/or sell price points for the anchor contract). The Spread Price Point values 330 indicate the range at which the trader is willing to buy and sell the spread. Two of the text boxes 331,332 are for buy points, and two boxes 333,334 are for sell points. As an example, the buy price level might be −15 and −1, whereas the sell price level might be set to 6 and 21. The −15 and −1 price level indicates that ideally the trader would like to buy the spread when the spread price point value is −15, but is willing to buy the spread at −1. Buying the spread in the present context means to purchase the anchor leg. Likewise, the 6 and 21 price level indicates that ideally the trader would like to sell the spread when the spread price point value is 21, but is willing to sell the spread at 6. Selling the spread in the present context means selling the anchor leg.

The Autoload feature of the present invention will automatically update the order quantity of the non-anchor leg based on a change in the net position. The Current 350 feature of the Common Pane 301 is a product of the spread and is calculated using the Current information from each of the two legs. The Current value of the spread is based on the net change of the two legs and is calculated by adding the ratio of leg 1 multiplied by the net change of leg 1 to the ratio of leg 2 multiplied by the net change of leg 2. Current Spread Price Point Value=(leg 1 ratio*leg 1 net change)+(leg 2 ratio*leg 2 net change).

Calculating the Spread

The present invention facilitates spread trading by calculating a spread in the market that in turn is used by a trader to buy one contract and sell another. By calculating and then displaying price level indicators, the present invention provides a trader with an illustration of where he should trade based on his specified ratio. The calculation of the price level indicators is based on various data that is input by the trader and includes the Net Change, the Spread Price Point values and the Ratio. The following equations and examples serve to illustrate the process by which placement of the price level indicators in the present invention is calculated.

One of several values that factor into the calculation of the price level indicators is Net Change. Net Change is calculated by subtracting the Settlement price of a leg from the Theoretical Last Traded Price of that leg. The Theoretical Last Traded Price is equivalent to the price at which the 'Price Points On' indicator is located. In selecting from the 'Price Points On' options (Best Bid/Offer, Best Working, Manual), which results in the display of the anchor leg indicators, the trader is essentially asking the question "(theoretically) if I traded at this price on the anchor leg, then where would I want to trade on the corresponding leg?" Using the prices from FIGS. 1-3, and assuming the trader is entering the market on the Bid side of the anchor commodity, the Settlement price of 9224 would be subtracted from the Theoretical Last Traded Price 180 (in the Bid column 111) for the leg of 9220 to total a net change of −4. The equation would appear as follows:

Net Change for a leg=Theoretical Last Traded Price of the leg−Settlement price of the leg  [Eq. 1]

The calculations of the Bid and Offer price level indicators are each two-part processes based on the Spread Price Point values. Referring again to FIG. 1, the trader is entered in the market with a Current price of 9220. When a trader enters the market on the Bid side of the anchor leg, the present invention will calculate the price level indicators for the Offer/Ask side on the non-anchor leg. There are a variety of formulas that can be used to calculate the non-anchor price level indicator. Typically, such formulas would include one or more of the factors described in Equation 2 below. In the preferred embodiment of the invention, the Spread Price Point value (331-334) would be subtracted from the anchor leg's ratio (205) multiplied by the anchor leg's net change (see Eq. 1). This total would then be divided by the non-anchor leg's ratio (206). The equation would appear as follows:

Non-Anchor Price Level Indicator=(Spread Price Point Value−(Anchor Leg Ratio*Anchor Leg Net Change))/Non-Anchor Leg Ratio  [Eq. 2].

The actual price, at which the indicator is displayed, is calculated by adding the Price Level Indicator Value, as determined by the above equation, to the Settlement Price of the leg. Thus, in the above example, (−15−(5*−4))/(−3)=−1.6666 (rounded to −2). Note: decimals will be rounded (e.g. 1.6666 is rounded to 2).

The first price level indicator, appearing as a colored marker (185), would then appear on the non-anchor leg next to the appropriate price level. In this case, since the calculation equaled −2, the price level indicator (185) would appear at 9865, 2 less than the Settlement price on the non-anchor leg.

The second price level indicator (186) is calculated in the same way with the one exception being that the 'Buy' spread price point value of −1 (332) would be used in place of the −15 (331) spread price point value. The calculations for this second price level indicator would appear as follows:

(−1−(5*−4))/−3=−6.3333 (rounded to −6).

As with the first price level indicator, the second indicator would appear as a colored marker (186) on the second leg at 9861, 6 less than the Settlement price (214) on the non-anchor leg. The range would therefore be between 9865 and 9861 as shown in column 162 of FIG. 1.

To calculate the range for the Bid side of the non-anchor leg, the same calculations would apply as those used above except that the 'Sell' Spread Price Point values of 21 (333) and 6 (334) would replace the 'Buy' Spread Price Point values of −15 and −1 in the equations, and the Net Change would be calculated using the Theoretical Last Traded Price 181 from the offer column 131 of the anchor leg, which in the above example is 9221. As shown in FIG. 1, column 152, this results in a range on the Bid side of the Non-anchor commodity of 9860 (183) to 9855 (184).

Figure 4:
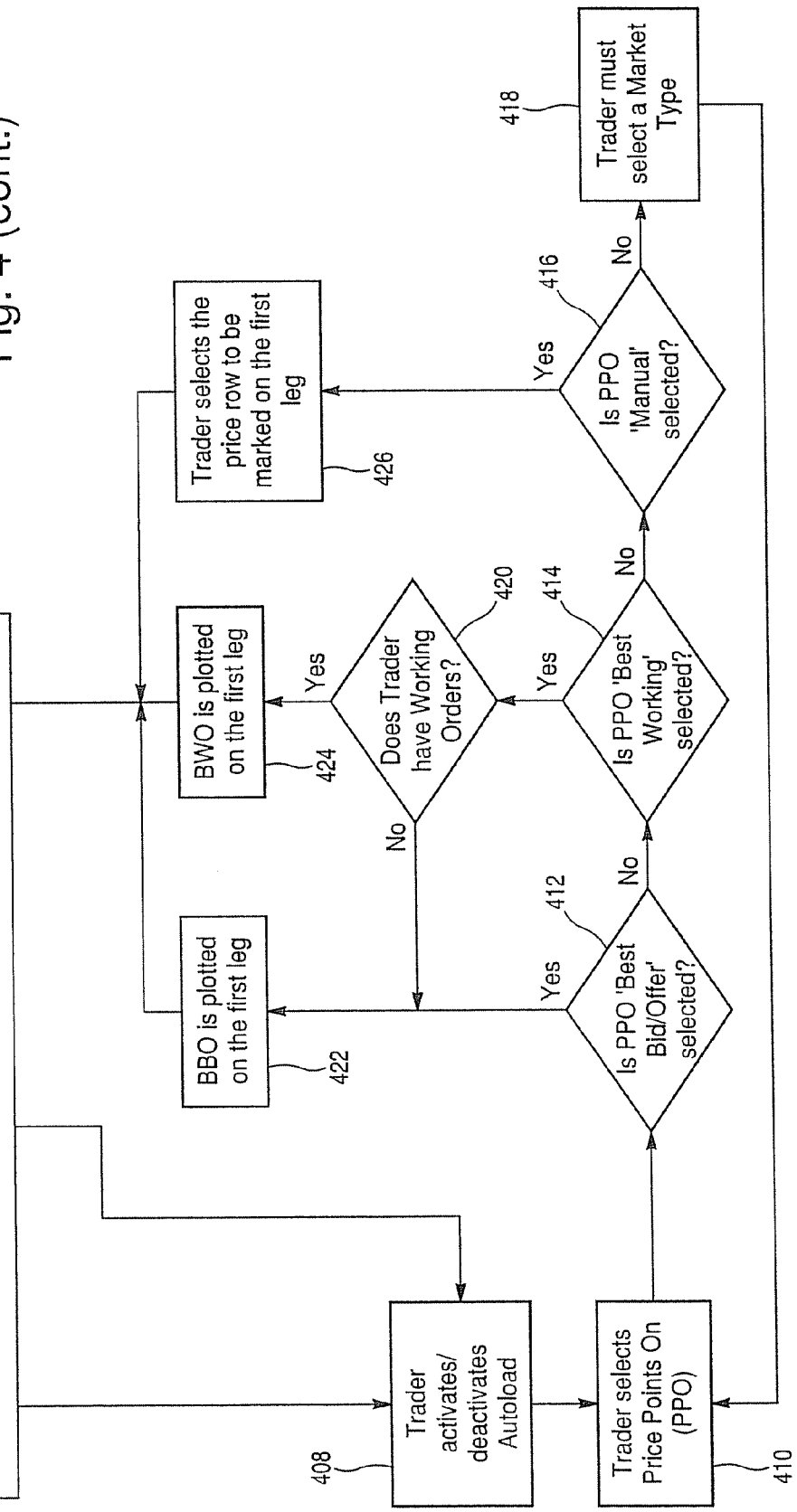
FIG. 4 is a flowchart illustrating the method of using the present invention.

The electronic spread trading tool, as developed by the inventors, aids in the process by which a trader protects a position where an investment is made by taking an offsetting position in a related product in order to reduce the risk of adverse price movements. The spread trading process, as defined by the present invention, is shown in FIG. 4. It begins when the spread tool is invoked and the trader has the market displayed on his monitor (step 402). As dictated by the present invention, the trader should have at least two related trading panes displayed within the spread tool application's window. The relation between the panes may be the display of comparable commodities, the display of identical commodities but from different exchanges, or some other relation.

To begin spread trading, in step 404, a trader would designate one leg (order) as the 'anchor' commodity. Next, in step 406, the trader would input a ratio representing the relationship between the commodities, where the numerator represents the anchor commodity and the denominator represents the second commodity (the other leg of the spread trade).

Referring again to FIG. 4, the trader would then select one option from the 'Price Points On' category in step 410 (the autoload blocks 428, 430 and 408 will be discussed later), which would place colored markers in separate columns of the anchor leg (151,161 in FIG. 1) corresponding to particular prices in the market depending upon the option chosen by the trader. If Best Bid/Offer were selected (step 412), the markers would appear next to the best bid currently in the market and the best offer currently in the market (step 422). Referring back to FIG. 1, the 'best bid' would be 9220 and the 'best offer' would be 9221. If Best Working were selected (step 414), and if the trader is determined to have working orders in step 420, then the markers would appear next to the best current bid and offer (step 424), which that particular trader currently had in the market. If there were no working orders determined (step 420), then the markers would be placed at the Best Bid/Offer (step 422). The Manual option (step 416), which is available if the best working is not selected in 414, allows a trader to place a marker next to any of the price levels available in the market (step 426). If the Autoload feature, described in more detail herein, is activated (step 428), then, in step 430, the non-anchored leg's quantity will be automatically updated. If it is not activated, then the user's input values will be used.

After selecting from the Price Point On options, the method proceeds to step 432 wherein the trader would enter values into the 'Spread Price Point value' boxes 330. There are four boxes in all, with two being designated as 'Buy' points 331, 332 and two as 'Sell' points 333, 334. In addition to Price Points On (Step 410) and Spread Price Point values step 432, the trader may also select whether or not to activate the Autoload option, which is shown as step 408 but could be activated at any time.

As discussed above, the Multiplier in step 434 functions to equalize products traded in different currencies (e.g. Euros and U.S. Dollars) or different tick values by converting the two products to a uniform currency (e.g. both in U.S. Dollars) or identical tick value. This function is embedded in the Multiplier and therefore does not require intervention or input from the trader, although it can be implemented manually as well as automatically. Just as the Multiplier has an automatic input feature, so do the Settlement 213, 214, Close 211, 212, and Change functions 209, 210. The Settlement feature is the price of the last transaction at the end of a given trading session, and is provided by the exchange. If the settlement is not provided by a specific exchange, then the Close price (closing price from the previous day) is used. The Change (Net Change) is also automatically calculated by as described above.

Once the input fields of the common pane (FIG. 1) and the two panes (FIGS. 2 and 3) attached to the Mercury Display are filled, it is then possible for the present invention to calculate the price level indicators. The present invention in step 438 would incorporate the parameters from the three panes described above to calculate the price level indicators for the buy and/or sell side of the commodity available in the second leg. The price level indicators would appear in the non-anchored leg, and would be displayed as two colored markers, much like those used to designate the Price Points On selection. The two indicators (markers) would represent the range of prices that the user should target when the user is attempting to trade the second, non-anchored, leg. These markers are simply guides, and the user has no restrictions on his ability to trade at price levels outside of the indicated levels.

Autoload

The 'Autoload' feature, as developed by the inventors, is initiated after a trader enters the market with a number of contracts (that he decides upon), and then attempts to buy or sell a specific amount of those contracts. The invention will automatically set the order quantity for the non-anchor contract (on the second leg) 174 when the user's net position in the anchor 175 contract changes. Based on the spread ratio (205,206) specified by the trader and the current positions, the present innovation will calculate and populate the order quantity field 174 of the non-anchored leg. The Net Position of the trader is the trader's current position (in terms of the quantity of contracts purchased) on the chosen commodity. In other words, if a trader bought 10 more contracts of a commodity than he sold, the value of his Net Position would be 10. Similarly, if that same trader sold 10 contracts more than what he purchased, his Net Position would be valued at −10.

Figure 2:
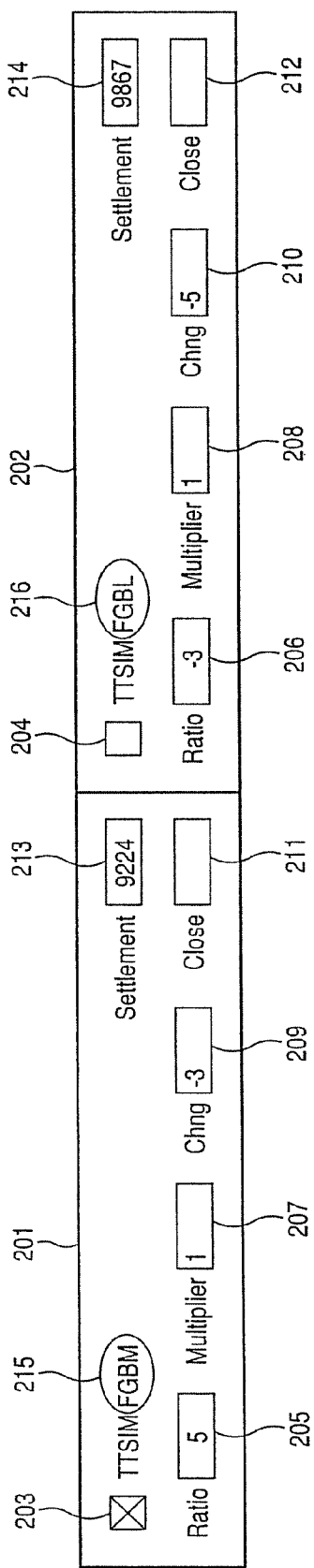
FIG. 2 illustrates two additional display panes used in the present invention for allowing user input of various parameters.

Reference is now made to FIG. 5, which illustrates all five display panes of the spread trading tool mentioned above and includes the elements listed with respect to FIGS. 1-3. To illustrate the present Autoload feature, consider a trader who is attempting to purchase 100 FGBM contracts shown as element 510. FGBL 216 is a related commodity serving as a non-anchor commodity to the trader's anchor in FGBM 215. FGBM/FGBL spread is currently set at a ratio of 5:3 shown in elements 205 and 206, and the trader holds no position in either contract. If 50 of the 100 desired contracts are matched in the market and filled (hit; see element 173), the system will calculate an FGBL quantity to maintain the ratio of 5:3 set in 205 and 206 and in this case, automatically set to 30 (see element 174), thus saving the trader critical time in making his next non-anchored leg trade, because the quantity for that trade does not need to be manually set and the user can place his order with just a single mouse click. If the remaining 50 FGBM contracts were to be filled, the present innovation would then automatically change the order quantity of the FGBL from 30 to 60, thereby preparing the user to offset the long 100 FGBM position, and satisfying the 5:3 ratio spread after his next non-anchor order.

The Autoload feature will also load partial quantities in the non-anchor order quantity. These partial quantities are quantities that are not an integer multiple of the ratio for the anchor side. This helps lead the trader to obtain an eventual full-on spread. A full-on spread is one in which the desired ratio is perfectly in tact. A full-on spread occurs when a trader accumulates a full ratio quantity rather than a partial quantity. For example, when the desired ratio is 5:3, a full-on spread would be 50 long:30 short or 25 long:15 short. If the Autoload feature were to wait for the trader to accumulate a full ratio quantity on the anchor side, this might cause the trader to miss his chance to hedge his position. By providing a trader with more immediate amounts, it will help him to hedge his position a little at a time.

For example, if a trader enters numbers in ratio boxes 205 and 206 to effect a ratio of 4:3, the Autoload innovation will not require that the trader obtain a net position of 4 for the anchor contract before populating the non-anchor order quantity. If the trader was working four contracts on the anchor, but was filled on a quantity of three, the present innovation would not require that the one additional order be filled, but rather it would calculate the non-anchor's order quantity and populate the window 174 by a proportionate amount based on the three fills in the anchor. Table 1 illustrates how the non-anchored order quantity would be filled when a partial fill occurs in the anchor contract. As is shown, the non-anchor order quantity is proportionate to the current net position in the anchor commodity in accordance with the set ratio, and is revised to the nearest integer.

TABLE 1

| Current (Net) Position for Anchor | Autoload Quantity for Non-Anchor |
|---|---|
| 1 | 1 (1 * ¾) |
| 2 | 2 (2 * ¾) |
| 3 | 2 (3 * ¾) |
| 4 | 3 (4 * ¾) |
| 5 | 4 (5 * ¾) |
| 6 | 5 (6 * ¾) |
| 7 | 5 (7 * ¾) |
| 8 | 6 (8 * ¾) |

In the present feature of the invention, trades do not necessarily occur in the second leg, and orders are not automatically sent to the market. Instead, the order quantity for each leg of the spread is merely calculated and placed into the Order Quantity window 174. For an actual order (at the calculated quantity) to be sent to market, the trader would use the order entry functionality of the Mercury Display application.

Price Level Indicators

The 'Price Level Indicators' feature, as developed by the inventors, provides a means by which a trader can set buy and sell price points for the spread. Referring again to FIG. 5, the price level indicators are displayed as colored markers 511-516 and appear in each contract in columns separate from the 'Bid' 111, 112, 'Offer' 131, 132, and 'Price' 121, 122 columns. The position of the marker in the anchored contract helps to determine the placement of the markers in the non-anchor contract (leg). Their exact location is based on the 'Price Points On' 310 that is selected. If the Best Bid/Offer mode 311 is selected, and orders in the market continue to change as new orders are placed and filled, the markers 511, 512 will track or move with the Best Bid/Offer price(s). If Best Working 312 is selected, the markers 511, 512 on the anchor leg will remain at the trader's best working bid and offer that are in the market. If Manual 313 is selected, the user will be able to manually select the buy and sell price points of his choice. Regardless of the method, the present invention will use the anchor price points corresponding to the markers 511 and 512 to calculate the price level indicators' locations 513-516 in the non-anchored contract. For example, if the trader selects Best Working 310 and enters the market, and gets filled on the bid side 151 of the anchor leg, a marker 511 will be displayed both at the price where he was filled and at each end of the calculated price level indicator prices 515 or 516 on the ask (offer) side 162 of the corresponding leg. Similarly, if the trader enters the market on the ask (offer) side 161 of one leg, markers will be displayed at both the point in which he entered the market 512 and at each spread price 513 or 514 point on the bid side 152 of the corresponding contract.

The location of the Price Level Indicators, as based on the 'Price Points On' 310 option that is selected by the trader, is dependent on the trader having, or not having, a fully hedged position on the anchor leg. In other words, the price level indicator will only remain at the Best Bid/Offer 311, Best Working 312, or Manual price 313 if the trader's designated ratio is maintained. For example, if a trader has a ratio of 5:3 set in 205/206, and he buys (fills) 5 contracts, the system calculates that he will need to sell 3 contracts in order to be fully hedged (thus keeping the marker at the 'Price Points On' price). Likewise, if that trader buys 10 contracts, he would need to sell 6 contracts. If the trader fills orders on only one side of the ratio, he will be unhedged, and the location of the Price Level Indicator 511, 512 will not reside at the 'Price Points On' 310 price, but will instead reside at the last traded price average price of the filled, unhedged position. For example, if a trader has selected Best/Bid Offer 311, and the best bid is a price of 9221 in column 121, then the marker 511 will reside at 9221. If that trader (with a 5:3 ratio) in 205, 206 buys 5 at a price of 9224, but does not sell any on the non-anchor, the marker 511 will reside at the 9224 price in column 121. In addition, it is also possible for a trader to continue to buy multiple contracts while selling none. In cases like this, the price level indicator will reside at the average price level of those filled buy orders. For example, the trader discussed above may begin by buying 5 contracts at a price of 9222 in column 121. He then may buy another 5 at a price of 9224 in column 121, and still another 5 at a price of 9226. The price level indicator 511 would then reside at the weighted average price of these three separate buy orders, which would be 9224. Assume, for example, that after filling these three buy orders, the trader fills a sell order in the non-anchor commodity for a quantity of 3. This will then hedge the first order (9222), and calculate a weighted average so that the level indicator 511 will now reside at the weighted average of the other two orders, 9224 and 9226, which would be 9225.

As discussed above, there are several factors involved in determining the placement of the markers in the non-anchored contract, including the Ratio, the Price Points On selection, the Net Change, and the Spread Price Point values. These factors are used to calculate the price level indicators, thereby determining the placement of the markers on the non-anchored contact.

The present invention lets a trader set up two different 'Buy' levels 331, 332 and two different 'Sell' levels 333, 334, which constitute the price ranges in which the trader wants to buy and sell the spread. For example, assume that a trader set the 'Buy' Spread Price Point values to −15 and −1 in 331 and 332, and he set the 'Sell' Spread Price Point values to 21 and 6 in 333 and 334. The "−15" and "−1" 'Buy' Spread Price Point values 331, 332 indicate that ideally the trader would like to buy the spread when the spread price point value is −15, but he is willing to buy the spread at −1. Buying the spread in the present context means to purchase the anchor leg. Likewise, the "21" and "6" 'Sell' Spread Price Point values 333 or 334 indicate that ideally the trader would like to sell the spread when the spread price point value is 21, but he is willing to sell the spread at 6. Selling the spread in the present context means selling the anchor leg.

Range Indications

Figure 6:
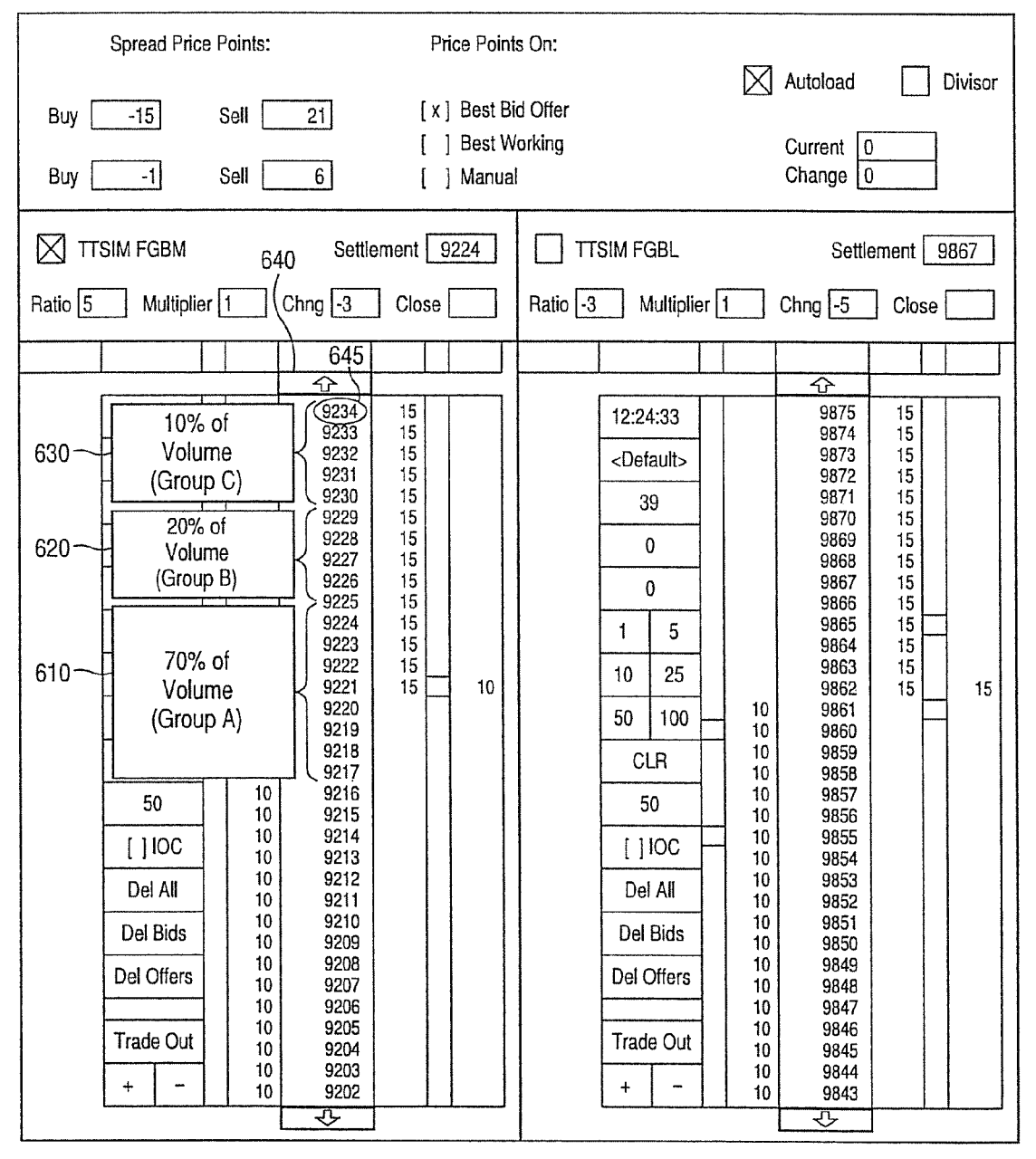

The 'Range Indications' feature shown in FIG. 6, as developed by the inventors, provides a trader with a vertical display of a market's prices while also providing a visual reference as to which prices the commodity is most often traded. The vertical layout applies to both legs of the spread and displays the prices for contracts for both of the commodities from the top of the panes to the bottom. The prices displayed in the price column 640 begin with the largest price 645 at the top of the column and descends as the price level decreases.

To distinguish a price point at which a large percentage of the daily volume has traded, from a price point at which little volume has traded, the present innovation incorporates the use of colors. Particular colors, which are chosen by the trader, differentiate the price points. Colors are used to represent the percentage of the daily volume that has traded at a particular price(s). Each price is colored depending on the quantity that is traded at a particular price or group of prices. In place of or in addition to color, other ways can be used to distinguish a price point. For example, the background color of the prices could differ, or there could be some other convenient visual indicator at or in adjacency to the pertinent price groups, such as the use of a different font, type of underlining or circling.

In the sample display using range indications shown in FIG. 6, the trader may want to view the daily trade volume of a particular commodity, and he may also want to see that volume divided into a plurality, such as, for example, three easily distinguishable groups of prices ranging from the most heavily traded volume for the day to the lightest. In embodiment, the present feature gives the trader the option of deciding how large he wants a group of prices to be and in what color or other visual designation he wants each group to be depicted. As illustrated in FIG. 6, the trader chose to divide the daily trade volume into three price groups: A) 70%, B) 20%, and C) 10%. Group A (element 610) represents the prices where 70% of the trading volume occurred for that day. Group B (element 620) represents the 20% of prices 640 that had the next heaviest amount of trading for the day, and Group C (element 630) represents the 10% of prices 640 that saw the lightest amount of trading. It should also be noted that each group may be dispersed throughout the market depth. For example, Group A may include price levels at 9217 and 9233, and Group B might be the price level 9221 while Group C is at price levels 9227 through 9231. The volume of trading may not always follow a true "bell-curve" where the most traded prices are grouped together. Instead, frequently the volume ebbs and flows at various prices in the market. In the preferred embodiment, the prices are arranged in descending order by volume and the percentile groupings are made by accumulating the values into the percentiles selected by the user. As shown to the trader, however, the prices are displayed in numeric order. The trader who is operating the application determines the colors or other visual indicators that are applied to the prices shown in column 640.

In one embodiment, a trader is provided access to the prices for the duration that the application is open. If the application is opened during the middle of the day, price information from the beginning of the day will not be available. This may be varied and is a design choice.

Drag and Drop

The 'Drag and Drop' feature is the ability to drag and drop Price Level Indicators 511-516 of FIG. 5 from one price level to another price level. The feature is performed on either of the Mercury Display panes 101 or 102 shown in FIG. 5, and in the preferred embodiment, is currently carried out by clicking on the left button of a user's mouse. While holding down that left mouse button, the trader would drag the Price Level Indicator 511-516 to a different price 121, 122 and release it when the marker is along side his desired price. The 'Drag and Drop' functions may also be effected by designated keystrokes on a trader's keyboard or through other actions performed by the trader.

On the anchor leg 101, a trader conducting the 'Drag and Drop' feature will perform the same functions as if he had selected the 'Manual' option 313 from the Price Points On options 310. The placement of the price level indicators 511, 512 will also be calculated as if the 'Manual' option 313 were selected.

A trader may also choose to 'Drag and Drop' one or more price level indicators on the non-anchored leg 102. When such an action is performed, the Spread Price Point value associated with the specific indicator 513-516 that was moved, will be altered. As described above in Equation 2, a Price Level Indicator would be calculated as follows:

Non-Anchor Price Level Indicator=(Spread Price Point Value−(Anchor Leg Ratio*Anchor Leg Net Change))/Non-Anchor Leg Ratio.

By dragging and dropping a Price Level Indicator 513-516 on the non-anchored leg 102, a trader has, in essence, defined the Price Level Indicator leaving the Spread Price Point value 330 to be determined. The Price Level Indicator, as defined by the following calculation, is the price level at which a trader has dragged and dropped an indicator 513-516. For example, when a trader drags and drops an indicator from a price of 2100 to a price of 2120, the price level of the Price Level Indicator would be 2120. In addition, the Anchor Spread Point Indicator 511, 512 refers to the price level, on the anchor leg, where the price indicator is resting. For example, if a user has been filled at 1000, 1200, and 1400 (1 lot at each price), the Anchor Spread Point Indicator 511 or 512 would be resting at 1200 (the average price of the fills). There are a variety of formulas that can be used to calculate the Spread Price Point values. Typically, such formulas would include one or more of the factors described in Equation 3 below. By way of example only, the following calculation would determine the Spread Price Point 331-334 value when the Price Level Indicator 513-516 is known.

Spread price point value=(Price Level Indicator*Non-Anchor Leg Ratio)+(Anchor Leg Ratio*Anchor Leg Spread Point Indicator) [Eq. 3]

Spread Market Display

The 'Spread Market Display' feature, as developed by the inventors, provides a trader with a window display that illustrates where the current spread is trading, while also showing the market depth as related to that spread. Market depth represents each bid and ask entered into the market that is not the inside market (the best bid price and quantity and the best ask price and quantity). The present feature, using the market depth from each leg that makes up the spread 710 and 720, calculates the spread 730 by subtracting one leg 720 from another 710 as shown, for example, in FIG. 7. The labels A-F (731-736) pointing to various spread prices correspond to examples A-F described below.

Figures 7, 8:
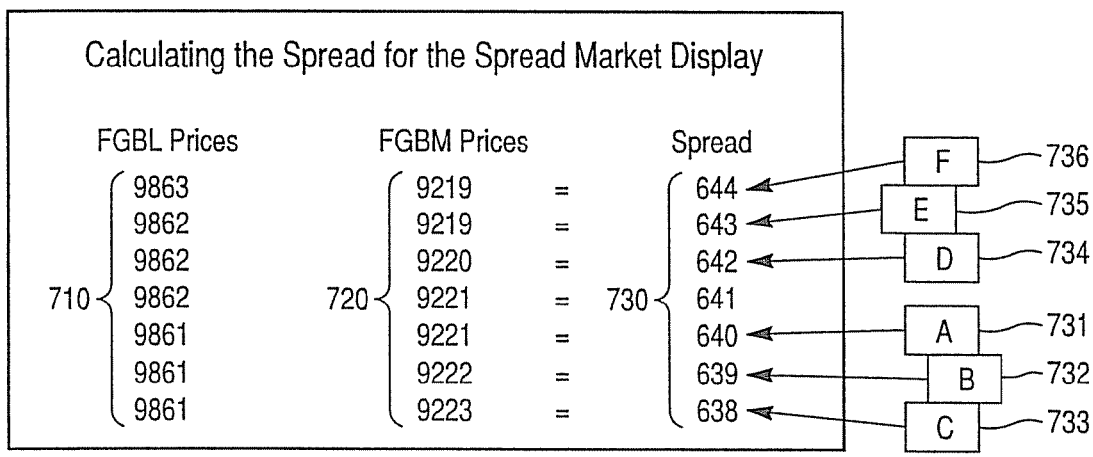
FIG. 7 illustrates examples calculations of price spreads between an anchor and a non-anchor commodity.
FIG. 8 illustrates a spread market display in accordance with a feature of the present invention.

An example of such a Spread Market Display is shown in FIG. 8. The middle column 810 is the spread price. This list of prices is also the market depth. The left column 820 is the bid column and displays the bid quantity currently available in the market (where the spread is trading) for that spread price. The right column 830 is the ask (offer) column and displays the offer quantity currently available in the market (where the spread is trading) for that spread price. The box 840 above the center column lists the commodity(s), and the box 850 to the right of box 840 displays the trader's ratio. The actual numbers shown in the display of FIG. 8 correspond to and are explained in the context of the examples to be described herein.

The current market spread is dependant on the best price point for the commodities at which a trader is presently trading. A trader entering the market on the bid side is looking to buy at the lowest offer (ask) price in the market, whereas a trader entering the market on the offer side is looking to sell for the highest bid price in the market. This feature of the present invention always begins with the best bid and best offer and calculates the spread based on both. For example, referring again to FIG. 7, and as calculated above, a trader who is entered in the market at the FGBL price of 9861 (best bid) column 710, when the corresponding leg (FGBM) column 720 has quantity available at the best offer (9221), will be trading on a spread of 640 (see column 730). As orders are filled and price levels in the market are "zeroed out", the best bid and best offer prices change (bid prices get lower as they are zeroed out, and offer prices get higher), and that results in a change in the spread. 'Zeroed Out' means that all of the quantity that was previously in the market for a specific product, and at a specific price, has been either bought or sold, and a quantity of 0 (zero) remains. Prices from the contracts that are used in the calculation of the spread, and ultimately in the market depth, can be rounded and displayed at whatever value the trader chooses (e.g. half ticks).

Figure 9:
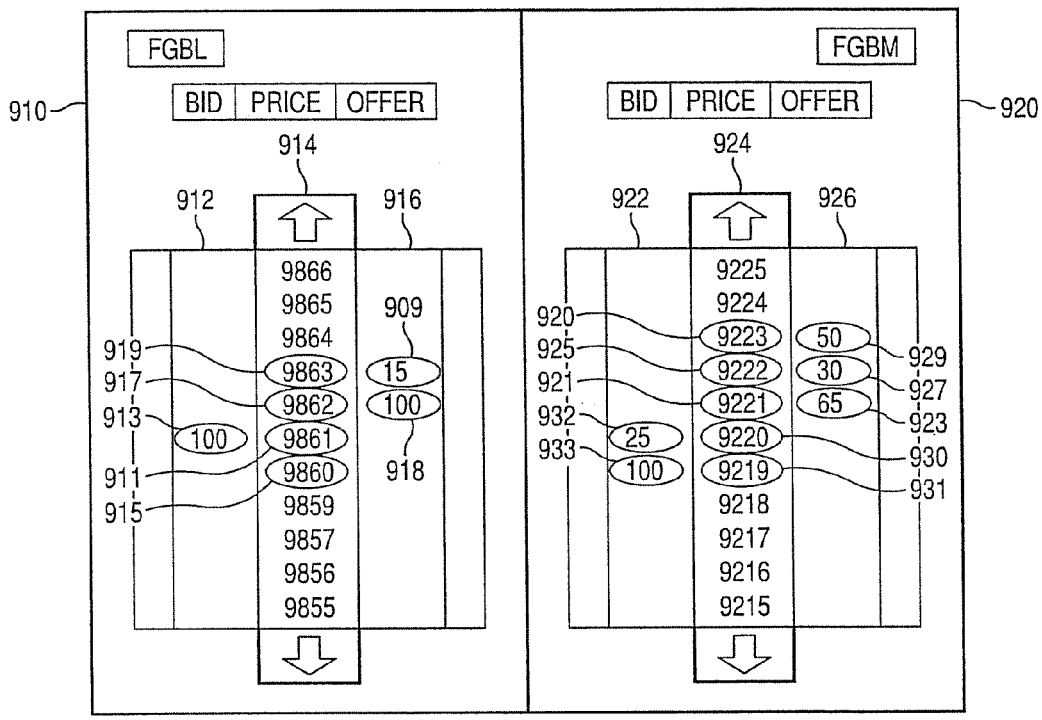
FIG. 9 illustrates a portion of the market depth of two commodities.

The present feature, which operates as part of the spread trading tool and creates its own market depth and spread from two similar contracts, does not require a trader to be entered in the market in order to view the Spread Market Display window 800 of FIG. 8. The illustrations in FIGS. 7-9 depict the display of two similar contracts, FGBM and FGBL 920 and 910 in FIG. 9 and the sample spread calculation display (see FIG. 7), and are presented as references to the examples that follow.

Examples A, B, and C are based on a trader entering the market on the bid side 912 of the FGBL leg 910 at the best bid price of 9861 (column 914).

It is important to note that for the purpose of illustration the following examples refer to a trader who has entered the market. However, the Spread Market Display information is available to any trader running the present application, and it is not necessary for that trader to be entered in the market in order to view the Spread Market Display window 800 of FIG. 8. Therefore, references to such are for the enhanced illustration of the innovation's process only. The present innovation will calculate market spreads 840 and display them in conjunction with the market's depth 820, 830 irrespective of whether or not a trader is actively involved in the market.

Example A

As mentioned above, the present innovation always begins with the best bid and best offer (and calculates the spread based on both). Therefore, a trader entering the market at the best bid price 911 (9861) would have that price matched with the best offer price 921. In the present example, that best offer price would be 9221. The best offer (9221) would be subtracted from the best bid price (9861) to determine the spread on which the trader would be trading (640). See Line A 731 of FIG. 7. The bid quantity 913 of 100 displayed on the FGBL leg 910 at the price point 911 where the trader entered the market, would suggest that the trader was interested in buying a quantity of 100 contracts from the corresponding FBGM leg 920. Because the present feature begins with the best bid and best offer, the application would look to make a match at the best offer price 921 (9221) on the corresponding FBGM leg 920. The FBGM best offer price (9221) currently has 65 contracts available 923, and therefore since corresponding bids and offers would exist, a match would be made. The match would result in all 65 FBGM best offer (9221) contracts 923 getting sold (zeroed out), a new FBGM best offer price being established (9222), and the desired quantity of 100 (at the best bid price of 9861) getting reduced to 35 contracts.

Example B

As a consequence of the market changes described in Example A, and particularly the change in best offer price from 9221 to 9222, the present feature would automatically calculate a new spread. The spread (639) is determined by subtracting the best offer (9222) from the best bid (9861). See Line B 732 of FIG. 7. As displayed in FIG. 9, the best offer price 925 (9222) currently has a quantity of 30 contracts available 927. Since the trader, still entered in the market, would still be looking to buy 35 contracts, and 30 contracts 927 would be available at the new best offer price, another match would be made. The result of this match would be that all 30 contracts at the best offer price 925 (9222) would be zeroed out, therefore reducing the trader's desired bid quantity from 35 to 5 contracts, and creating a third new best offer price of 9223.

Example C

As a consequence of the changes in the market resulting from the activity described in Example B, and particularly the change in the best offer price from 9222 to 9223, the present innovation would automatically calculate a new spread. The spread (638) is determined by subtracting the best offer (9223) from the best bid (9861). See Line C 733 of FIG. 7. As displayed in FIG. 9, the best offer price 928 (9223) currently has a quantity of 50 contracts available 929. However the trader, in the market at the best bid price 911 (9861), would only be looking to buy (fill) the 5 remaining contracts from his original bid. Since 50 contracts are available 929 at the corresponding best offer price 928, and the trader has a bid entered in the market at the best bid price, a match would be made, the result of which would include the best bid price 911 (9861) getting zeroed out. In addition, and as a result of the aforementioned market activity, the best offer price 928 (9223) would remain the best offer but would be reduced from 50 to 45 contracts, and the best bid price would become 9860 (the next largest available bid price 915).

Referring again to FIG. 8, in Example A, the trader was trading at a spread price of 640 and he zeroed out the quantity. Thus, as shown in FIG. 8, the spread price of 640 (column 840) has no (zero) quantity displayed in column 820. In Example B, the same happened since the 30 contracts were zeroed out, but in Example C only 5 out of 50 contracts were sold, leaving a quantity of 45. Thus, 45 is shown in column 820 next to the spread price of 638 (column 840).

Examples D, E, and F are based on a trader entering the market on the offer side 916 of the FGBL leg 910 at the best offer price 917 of 9862.

Again, it should be noted that a trader need not be entered in the market in order to view the Spread Market Display window 800, and therefore any references to such are for the enhanced illustration of the innovation's process only. The present feature will calculate market spreads 840 and display them in conjunction with the market's depth 820, 830 irrespective of whether a trader is actively involved in the market.

Example D

Similar to the manner in which the present feature operates when a trader enters the market at the best bid price, a trader entering the market at the best offer price would have that price matched at the best bid price on the corresponding leg. In the present example, that best offer price 917 would be 9862. The best bid 930 (9220) would be subtracted from the best offer price 917 (9862) to determine the spread on which the trader would be trading (642). See Line D 734 at FIG. 7. The offer quantity 918 of 100 displayed on the FGBL leg 910 at the price point 917 where the trader entered the market, would suggest that the trader wanted to sell 100 contracts. Again, because the present innovation begins with the best bid and best offer, the application would look to make a match at the best bid price 930 (9220) on the corresponding FGBM leg 920. At the FGBM best bid price 930 (9220) a trader is interested in buying 25 contracts 932, and therefore since corresponding bids and offers exist, a match would be made. The match would result in all 25 FGBM best bid (9220)

contracts 932 getting zeroed out, a new FGBM best bid price 931 being established (9219), and the desired FGBL sell quantity 918 of 100 getting reduced to 75 contracts.

Example E

As a consequence of the market changes described in Example D, and particularly the change in the best bid price from 9220 to 9219, a new spread would be calculated. The spread of 643 would be calculated by subtracting 9219 (the best bid) from 9862 (the best offer). See Line F 735 of FIG. 7. The trader, who entered in the market at 9862 (the best offer price 917) and filled 25 of his 100 offer (ask) contracts 918, would have an order of 75 contracts remaining. On the corresponding FGBM leg 920, and at the new best bid price (9219), a trader has a bid order 933 of 100 contracts, which would be matched with the 75 FGBL contracts. As a result of the aforementioned match, the best offer 917 (9862) would be zeroed out and the best bid price 931 (9219) would be reduced from 100 to 25 contracts. In addition, the new best offer price 919 would become 9863 (the lowest available offer price).

Example F

As a consequence of the changes in the market resulting from the activity described in Example E, and particularly the change in the best offer price from 9862 to 9863, a new spread would be calculated. The spread (644) is determined by subtracting the best bid (9219) from the best offer (9863). See Line F 736 of FIG. 7. The trader, entered in the market at the best offer price 919 (9863), currently has an order 909 for 15 contracts in the market. On the corresponding leg 920, a trader entered at the best bid price 931 (9219), currently has an order of 25 contracts in the market. Since contracts are available at the coinciding best bid and best offer prices 931 and 919, a match would be made, and as a result the best offer price 919 (9863) would be zeroed out and the best bid price 931 (9219) would be reduced from 25 to 10 contracts.

Referring again to FIG. 8, in Example D, the 642 spread price (column 840) was zeroed out. Thus, no quantity is shown next to the spread price of 642. In Example E, the same occurred. Thus, no quantity is shown next to the spread price (column 840) of 643. In Example F, however, 10 contracts remain (column 830) at a spread price of 644 (column 810), and is shown accordingly in FIG. 8 (column 830) next to spread price 644.

Traded Spread Display

The Traded Spread Display serves to provide a trader with historical data illustrating specifically where a spread could have traded. A trader operating the present Spread Tool invention will have two corresponding trading screens 101 and 102 (legs), as referenced throughout this document, displayed on his workstation's monitor. From those screens the trader is able to buy and sell commodities simultaneously. The displaying of information, as related to the present feature, is based on the best prices in the market, and the feature will display both the spread price and the total quantity traded at that spread price. To illustrate the present innovation, the displays shown in FIG. 10 are used, which represent the two markets 1010 and 1020 used as the spread legs.

Figure 11:
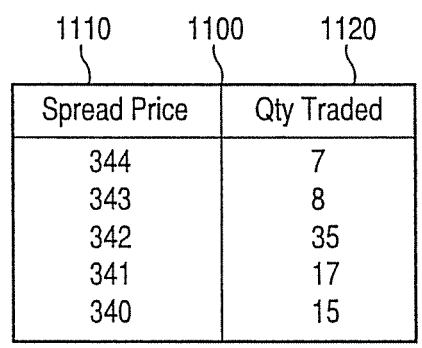
FIG. 11 illustrates a traded spread display in accordance with a feature of the present invention.

The 'Traded Spread Display' feature, an example of which is shown in FIG. 11, provides a trader who is operating the present invention with an additional window display 1100 that illustrates where a spread has traded throughout the day. More specifically, the window displays spread prices 1110 and quantities 1120 as they are traded in the market.

Figure 10:
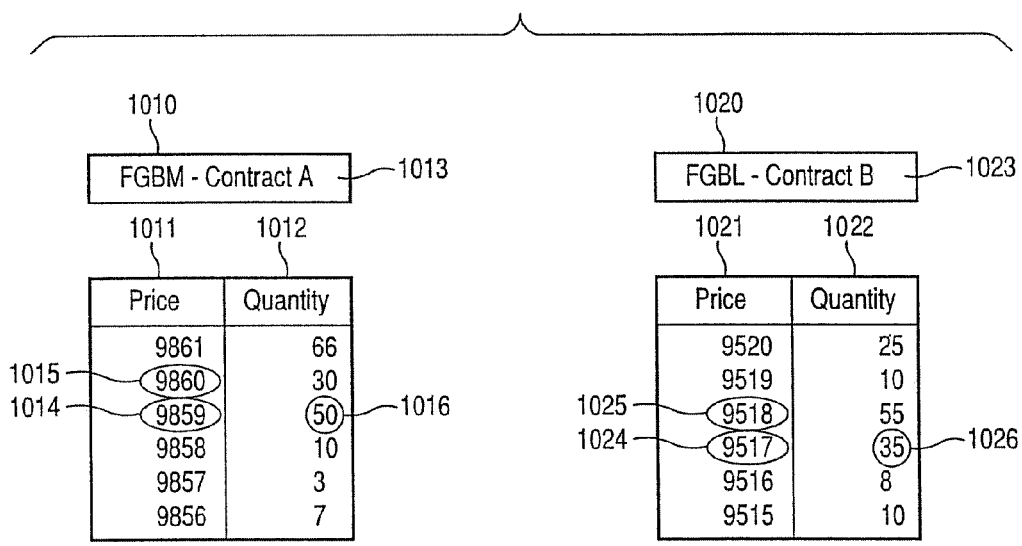
FIG. 10 illustrates a portion of the trade amount and traded price of two commodities.

Spread prices are determined by subtracting a price point shown in FIG. 10 on one leg 1020 from a price point on the other leg 1010. This calculation initially incorporates either the best bid for each leg or the best ask (offer) for each leg. In FIG. 10, the bids are shown in one color while the asks/offers are shown in another color. As prices are zeroed out, new best prices will be created and the spread will be recalculated using either the new best bid or best offer prices. Prices are zeroed out when the entire quantity associated with that price are either bought or sold, leaving a total quantity of zero. The quantities 1120 displayed are the total number of contracts that have traded throughout the day at each particular spread price. The 'Traded Spread Display' 1100 will maintain a running total of the quantities for each of these applicable spread prices. For example, if a spread trades at a price level of 340 (column 1110) and at a quantity of 15 (column 1120), the trade would be recorded and displayed in the 'Traded Spread Display' 1100. If one hour later the spread were to trade again at 340, and would trade this time at a quantity of 12, then the display would change from 15 to 27 for the traded quantity Column 1120.

FIG. 10, in which Contract A 1013 has a best bid price 1014 of 9859 and a best ask (offer) price 1015 of 9860, and Contract B 1023 has a best bid price 1024 of 9517 and a best ask price 1025 of 9518, further illustrates the calculation and display of the spread price 1110 and quantity 1120. If, for instance, 10 contracts trade on the 9859 bid price of Contract A 1013, then the buyer could sell 10 contracts at the 9517 bid price on Contract B 1023. In this scenario the spread would have traded 10 times at a price of 342 (9859-9517). If, for example, all 50 contracts 1016 would have traded at the 9859 price (1014), then the buyer could only have sold 35 contracts at the 9517 price (1024) since that is the maximum quantity available 1026 on Contract B 1023 and at that price 1024. In this scenario the spread would have traded 35 times at 342 as is shown in columns 1110 and 1120 of display 1100. The trader could then sell 8 contracts at 9516, see columns 1021 and 1022, with the spread trading 8 times at 343, see columns 1110 and 1120 (9859-9516). Finally, selling his remaining 7 contracts at a price of 9515, see columns 1021 and 1022, could zero the trader's order out, resulting in the spread trading 7 times at 344 (9859-9515), see columns 1110 and 1120. All told, in the scenario above, 50 spreads could have traded at three different price levels 342 and 344 (see columns 1110 and 11120).

FIG. 11 depicts what the 'Traded Spread Display' window would look like based on the above scenario. It should be reiterated that the price displayed in column 1110 is not the price of any individual product in the market, but is instead the spread price (Bid price of Contract A-Bid price of Contract B, or Ask price of Contract A-Ask price of Contract B). In addition, the quantities that are displayed in column 1120 for the present innovation are not quantities that currently reside in the market, nor are they the quantities of any specific product; rather they constitute a measure of how many spreads have traded at that particular price level throughout the day. Lastly, the information in this window is limited by how long the trader has the application open, since, in the preferred embodiment, there is no database currently attached to the window that will store previous trade information. However, the addition of such a database is within the skill of the art.

The calculations and other operations described herein may be implemented using a spreadsheet mode and/or by any standard rule based logic or other convenient logic for determining the appropriate display numbers and indicators. Thus, a spread trading tool has been described according to the present invention. Many modifications and variations may be made to the techniques and structures described and illustrated herein without departing from the spirit and scope of the invention. Accordingly, it should be understood that the methods and interfaces described herein are illustrative only and are not limiting upon the scope of the invention.

What is claimed is:

1. A computer-based method for facilitating the entry of an order for a commodity being traded electronically, the order having a quantity and a price, the method comprising:

receiving by a computing device a current position for a first commodity, wherein the current position comprises a particular quantity of the first commodity that has been bought or sold;

automatically calculating by the computing device a value based in part on a formula and the current position for the first commodity, wherein the formula is associated with a spread established between the first commodity and a second commodity;

automatically setting by the computing device a quantity based on the calculated value for an order to be sent to an electronic exchange, wherein the order comprises a request to buy or sell the automatically set quantity of the second commodity at a specified price; and generating by the computing device an order message for the order to buy or sell the second commodity, the order message to be sent to the electronic exchange and comprising the set quantity at the specified price.

2. The method of claim 1, wherein the formula comprises a ratio.

3. The method of claim 2, wherein the ratio has a numerator that is associated with the first commodity and a denominator that is associated with the second commodity.

4. The method of claim 1, wherein calculating a value comprises multiplying the current position for the first commodity by a ratio.

5. The method of claim 1, wherein the first and second commodities comprise legs of a spread and the formula comprises a spread ratio.

6. The method of claim 1, further comprising sending by the computing device the order message to the electronic exchange.

7. The method of claim 6, wherein sending the order message is done in response to a single action of a user input device.

8. The method of claim 7, further comprising displaying by the computing device a plurality of bid and ask indicators for the second commodity in relation to a plurality of price levels on a price axis.

9. The method of claim 8, wherein the single action of the user input device comprises selecting an area associated with a price level on the price axis with a pointer of the user input device positioned over the area associated with the price level on the price axis.

10. The method of claim 7, wherein the single action sets a price parameter for the order.

11. The method of claim 1, further comprising initiating by the computing device placement of the order for the second commodity that comprises an order quantity value equal to the set quantity.

12. The method of claim 11, wherein initiating placement of the order is accomplished through a single action of a user input device.

13. The method of claim 11, further comprising displaying by the computing device bid and ask indicators for the second commodity in relation to price levels on a price axis.

14. The method of claim 13, wherein initiating placement of the order is accomplished through a single action of a user input device with a pointer positioned over an area associated with a price level on the price axis.

15. The method of claim 1, further comprising automatically recalculating by the computing device the value when the current position for the first commodity changes.

16. The method of claim 15, further comprising setting by the computing device the quantity for the order for the second commodity to the recalculated value.

17. The method of claim 1, further comprising displaying by the computing device the quantity.

18. The method of claim 1, wherein the current position comprises a trader's net position for the first commodity.

19. The method of claim 1, wherein the first commodity comprises an anchor leg of a spread and the second commodity comprises a non-anchor leg of the spread.

* * * * *